US012697617B2

(12) United States Patent
de Groot et al.

(10) Patent No.: US 12,697,617 B2
(45) Date of Patent: Aug. 4, 2026

(54) PARTICLE SEPARATION SYSTEMS AND METHODS

(71) Applicant: LevitasBio, Inc., Menlo Park, CA (US)

(72) Inventors: Theodorus Evan de Groot, Oakland, CA (US); Geoff Facer, Menlo Park, CA (US); Amirreza Malekanfard, Menlo Park, CA (US); Gang Sun, Cupertino, CA (US); Lesley Suzanne Weaver, Palo Alto, CA (US)

(73) Assignee: LEVITASBIO, INC., Menlo Park, CA (US)

( * ) Notice: Subject to any disclaimer, the term of this patent is extended or adjusted under 35 U.S.C. 154(b) by 826 days.

(21) Appl. No.: 17/938,825

(22) Filed: Oct. 7, 2022

(65) Prior Publication Data

US 2023/0112068 A1 Apr. 13, 2023

Related U.S. Application Data

(60) Provisional application No. 63/294,915, filed on Dec. 30, 2021, provisional application No. 63/253,448, filed on Oct. 7, 2021.

(51) Int. Cl.
*G01N 15/075* (2024.01)
*B01L 3/00* (2006.01)
*G01N 15/06* (2024.01)

(52) U.S. Cl.
CPC ... *B01L 3/502753* (2013.01); *B01L 3/502715* (2013.01); *B01L 3/502746* (2013.01); *B01L 3/502761* (2013.01); *G01N 15/0656* (2013.01); *B01L 2200/0652* (2013.01); *B01L 2200/12* (2013.01); *B01L 2300/0663* (2013.01); *B01L 2300/0864* (2013.01);

(Continued)

(58) Field of Classification Search
None
See application file for complete search history.

(56) References Cited

U.S. PATENT DOCUMENTS

| | | | | |
|---|---|---|---|---|
| 8,894,946 B2 * | 11/2014 | Nielsen | .................... | C12Q 1/68 |
| | | | | 422/417 |
| 10,345,219 B2 * | 7/2019 | Handique | ................ | G01N 1/28 |

(Continued)

FOREIGN PATENT DOCUMENTS

| | | | | |
|---|---|---|---|---|
| WO | WO-2019191137 A1 * | 10/2019 | .......... | B01L 3/50273 |

OTHER PUBLICATIONS

PCT/US2022/046087 , International Search Report and Written Opinion, Mailed On Mar. 20, 2023, 23 pages.

(Continued)

*Primary Examiner* — Charles Capozzi
*Assistant Examiner* — Velvet Elizabeth Heron
(74) *Attorney, Agent, or Firm* — Kilpatrick Townsend & Stockton LLP

(57) ABSTRACT

Magnetic levitation particle separation systems and methods for use with multi-channel flow cells. The system may include a core for receiving and holding the flow cell, with upper and lower clamps for securing the flow cell and positioning it relative to an array of magnets. The system is configured to image particle separation in processing channels of the flow cell, and to regulate the flow cell's temperature. The core may be removable as a single unit, facilitating reconfiguration of the system.

24 Claims, 40 Drawing Sheets

(52) U.S. Cl.
CPC . *B01L 2300/0883* (2013.01); *B01L 2400/043*
(2013.01); *G01N 15/075* (2024.01)

(56) References Cited

U.S. PATENT DOCUMENTS

| | | | |
|---|---|---|---|
| 2002/0115163 A1* | 8/2002 | Wang | G01N 30/00 |
| | | | 435/173.9 |
| 2012/0080360 A1* | 4/2012 | Stone | B03C 1/01 |
| | | | 210/695 |
| 2020/0038866 A1* | 2/2020 | Henry | B01L 3/502746 |
| 2021/0260577 A1* | 8/2021 | Facer | B01L 3/50273 |
| 2022/0097062 A1 | 3/2022 | Facer et al. | |

OTHER PUBLICATIONS

PCT/US2022/046087, "Invitation to Pay Additional Fees and, Where Applicable, Protest Fee", Jan. 25, 2023, 5 pages.
Durmus et al., Magnetic Levitation of Single Cells, Proceedings of the National Academy of Sciences of the United States of America, vol. 112, No. 28, Jul. 14, 2015, pp. E3661-E3668.

* cited by examiner

200

208

210

212

206

204

202

216

214

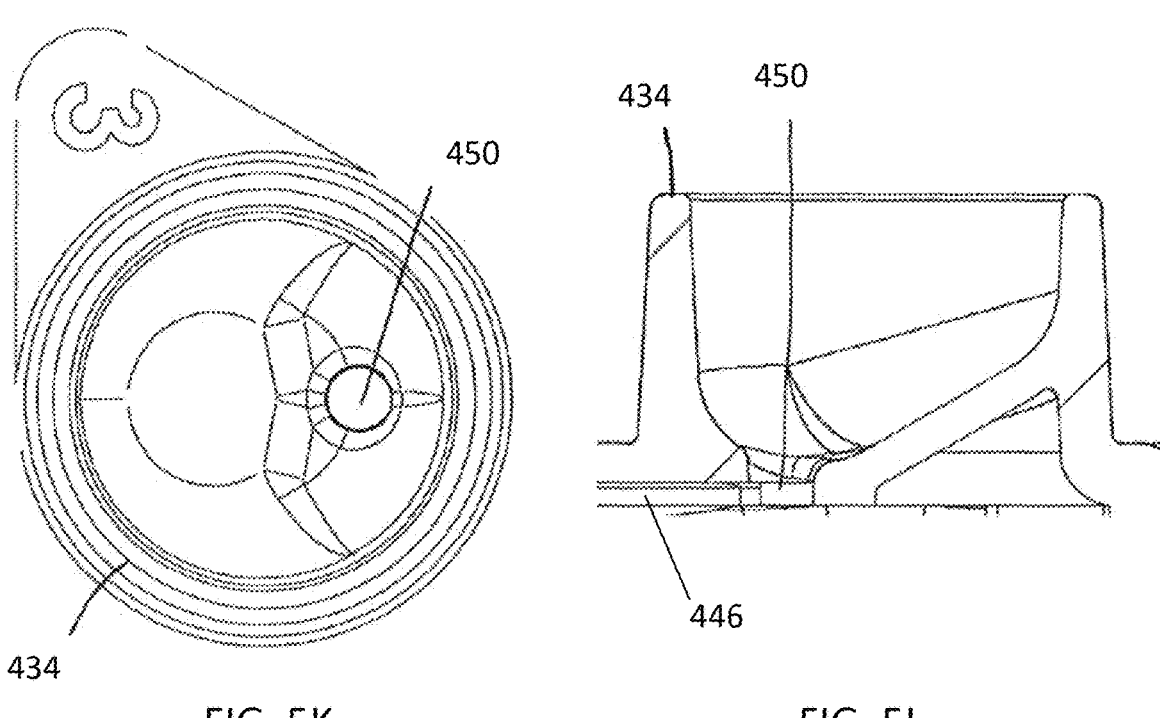
FIG. 5K                                    FIG. 5L
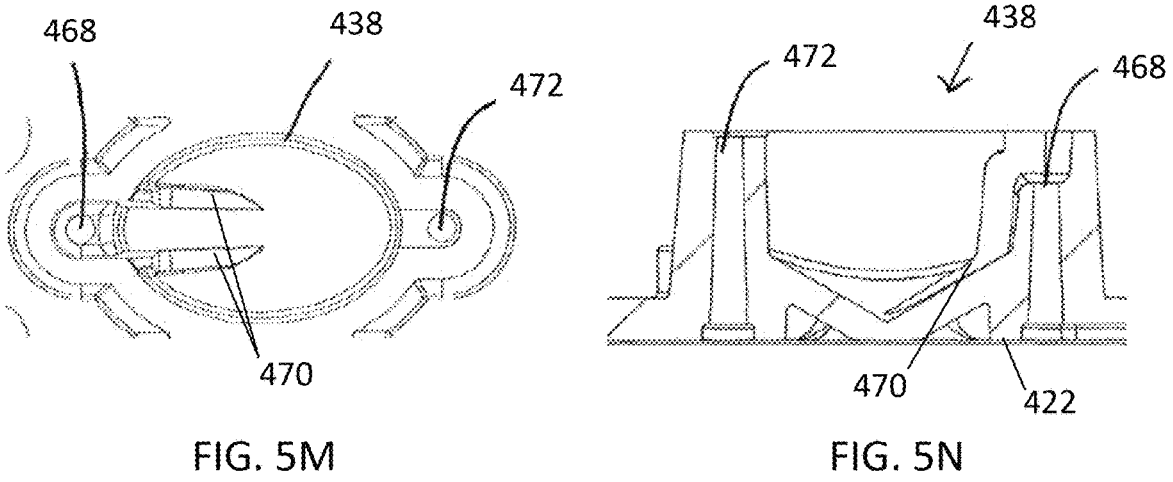
FIG. 5M                                    FIG. 5N

608

Alignment pins

PARTICLE SEPARATION SYSTEMS AND METHODS

CROSS-REFERENCES TO RELATED APPLICATIONS

This application claims the benefit of U.S. Provisional Application No. 63/294,915, filed Dec. 30, 2021, and U.S. Provisional Application 63/253,448 filed Oct. 7, 2021. The entire contents and disclosures of these applications are incorporated herein by reference.

RELATED FIELDS

Systems and methods for separating particles, particularly systems and methods utilizing magnetic levitation for particle separation.

BACKGROUND

Magnetic levitation recently emerged as a useful method for separating particles, including cells, biological molecules, and other types of particles. By flowing particles into a channel exposed to a magnetic field gradient, particles may be separated according to type or state at different levitation heights caused by their physical properties. Once separated into discrete bands at different levitation heights, the separated particles may be analyzed and collected.

SUMMARY

This patent describes several examples of improved magnetic levitation systems and methods for particle separation, as well as examples of multi-channel flow cell cartridges for use with those systems and methods. The systems, methods, and cartridges may be configured to separate relatively large numbers of particles in a single processing run.

In one example, a multi-channel flow cell cartridge includes: comprising: (a) a substrate; (b) a plurality of fluidic separation channels formed in the substrate, in which: each fluidic channel includes a magnetic levitation processing channel in fluidic communication with an inlet and at least two outputs, each processing channel includes at least one divider vertically separating a portion of the processing channel into at least an upper part and a lower part, the upper part in fluidic communication with one of the outputs and the lower part in fluidic communication with the other of the outputs, each processing channel further includes at least one imaging surface extending along a length of the processing channel, the imaging surface configured to allow imaging of magnetic levitation of particles in the processing channel.

In some instances, the processing channels may each have two opposing imaging surfaces extending along the processing channel.

In some instances, the processing channels may be coplanar.

In some instances, the cartridge may have several channel beams formed in the substrate, the channel beams extending between an inlet end and an outlet end of the flow cell cartridge, the channel beams each having one of the processing channels.

In some instances, each channel beam may be spaced apart from adjacent channel beams.

In some instances, the cartridge may also include several openings extending through the substrate, each opening extending between two adjacent channel beams along the lengths of the processing channels, the openings configured for optical access to the imaging surfaces.

In some instances, each channel beam may include at least one alignment tab.

In some instances, the substrate further may have side walls extending downwardly away from the fluidic channels.

In some instances, the side walls may each include an opening configured for optical access to one of the imaging surfaces.

In another example, a magnetic levitation particle separation system for use with a flow cell cartridge, the flow cell cartridge having a plurality of processing channels, the particle separation system includes: (a) a holder configured to receive and hold the flow cell cartridge; (b) an array of magnets, the array of magnets configured to apply magnetic field gradients to the processing channels when the flow cell cartridge is received and held by the holder, the array of magnets positioned at least one of above and below the processing channels when the flow cell cartridge is received and held by the holder; and (c) an imager configured to image vertical separation of particles in the processing channels while the flow cell cartridge is received and held by the holder and while the array of magnets is positioned at least one of above and below the processing channels.

In some instances, the magnetic levitation particle separation system may have a maximum particle separation capacity in a single separation run of at least about 100 million particles.

In some instances, the magnetic levitation particle separation system may have a maximum particle separation capacity in a single separation run of at least about 100 million particles, the particles having a characteristic dimension between 1 and 5 microns.

In some instances, the magnetic levitation particle separation system may have a maximum particle separation capacity in a single separation run of at least about 100 million spherical particles, the particles having an average diameter of at least about 3 microns.

In some instances, the magnetic levitation particle separation system may have a maximum particle separation capacity in a single separation run of at least about 20 million particles per processing channel.

In some instances, the magnetic levitation particle separation system may have a maximum particle separation capacity in a single separation run of at least about 20 million particles per processing channel, the particles having a characteristic dimension between 1 and 5 microns.

In some instances, the magnetic levitation particle separation system may have a maximum particle separation capacity in a single separation run of at least about 20 million spherical particles per processing channel, the particles having an average size of at least about 5 microns.

In some instances, the imager may be configured to image vertical separation of particles in the processing channels via a folded optical path.

In some instances, the folded optical path may include a path portion that extends between a magnet positioned directly above and a magnet positioned directly below one of the processing channels.

In some instances, the folded optical path may include a second portion that extends through an opening in the holder between two adjacent magnets of the magnet array.

In some instances, the imager may include an optical periscope, with the system configured to move the periscope to a position adjacent one of processing channels while the flow cell cartridge is received and held by the holder and while the array of magnets is positioned above and below the plurality of processing channels of the flow cell cartridge.

In some instances, the system is may be configured to scan the periscope along a length of the processing channel while the flow cell cartridge is received and held by the holder and while the array of magnets is positioned above and below the plurality of processing channels of the flow cell cartridge.

In some instances, the holder may have several openings sized and positioned to allow the periscope to move through the openings to positions adjacent the processing channels.

In some instances, the holder may be a core unit having an upper clamp and a lower clamp, the core configured to receive and clamp the flow cell cartridge between the upper and lower clamps; and the array of magnets may include a first array of magnets located in the upper clamp and a second array of magnets located in the lower clamp.

In some instances, the imager may be configured to image vertical separation of particles in one of the processing channels via an optical path including: a first portion of the optical path extending between a magnet of the first array positioned directly above the processing channel and a magnet of the second array positioned directly below the processing channel; and a second portion of the optical path extending between the magnet of the first array positioned directly above the processing channel and another magnet of the first array positioned above an adjacent processing channel.

In some instances, the holder may be a core unit that is configured to regulate a temperature of the processing channels of the flow cell cartridge.

In some instances, the core unit may have several temperature conductive surfaces that are located such that, when the flow cell cartridge is received and held by the core unit, the temperature conductive surfaces contact the processing channels.

In some instances, the temperature conductive surfaces may be end surfaces of pillars formed of a temperature conductive material, each pillar holding a magnet of the magnet array.

In some instances, the system may be configured to cool the pillars, thereby cooling the processing channels via conduction.

In some instances, the core may have a cooling assembly in contact with the pillars and configured to conductively cool the pillars.

In some instances, the cooling assembly may include a temperature control plate, a thermoelectric cooler, and a heat sink.

In some instances, the core unit may include air channels extending along the pillars from the cooling assembly towards the pillar end surfaces, the air channels configured to cool the pillars and the flow cell cartridge via convective air flow.

In some instances, the core unit may be a removable unit of the system.

In some instances, the core unit may include a flow cell cartridge holder, a fluidic connector assembly configured to fluidically connect the flow cell cartridge to a pump sub-system, the magnet array, and a cooling assembly.

In some instances, the system may further include a second core unit having a second flow cell cartridge holder, a second fluidic connector assembly, a second magnet array, and a second cooling assembly, in which the second magnet array has a configuration that is different from the magnet array of the other core unit; and in which the system is configured to alternatively receive and operate both core units.

In another example, a particle separation method includes: (a) loading a multi-channel flow cell cartridge into a particle separation system, the multi-channel flow cell cartridge having at least a first processing channel and a second processing channel; (b) flowing a first suspension of particles and paramagnetic fluid into the first processing channel; (c) flowing a second suspension of particles and paramagnetic fluid into the second processing channel; (d) exposing the first and second suspensions in the first and second processing channels to one or more magnetic field gradients; (e) separating the particles in the first processing channel into one or more bands, and separating the particles in the second processing channel into one or more bands; (f) imaging the one or more separated bands in the first processing channel, and imaging the one or more separated bands in the second processing channel; and (g) separately collecting at least one of the bands.

In some instances, imaging the separated bands may include using an imaging sub-system of the particle separation system to image the separated bands, the imaging sub-system having at least one optical component at least partially positioned in a region between the first processing channel and the second processing channel.

In some instances, the multi-channel flow cell cartridge may include an opening positioned between the first and second processing channels, and wherein the optical component of the imaging sub-system is at least partially positioned in the opening during imaging of at least one of the processing channels.

In some instances, the optical component may be a reflector.

In some instances, the imaging sub-system may also include a second optical component positioned across one of the first or second processing channels, opposite the at least one optical component in the opening during imaging of at least one of the processing channels.

In some instances, the method may also include, using the particle separation system, moving the at least one optical component into the opening, then imaging at least one of the first and second processing channels, then moving the at least one optical component out of the opening.

In some instances, the method may also include using the particle separation system to move the at least one optical component from one position in the opening to another position in the opening; and imaging at least one of the first and second processing channels at different locations along a length of the channel.

In some instances, the opening may be an elongated opening extending along the first and second processing channels.

In some instances, imaging the separated bands may involve using an imaging sub-system of the particle separation system to image the separated bands, the imaging sub-system having at least one folded optical path.

In some instances, loading the multi-channel flow cell cartridge into the particle separation system may include positioning the multi-channel flow cell cartridge relative to an array of magnets.

In some instances, the array of magnets may include at least a first magnet and a second magnet, the first magnet adjacent to the first separation channel and the second magnet adjacent to the second separation channel when the multi-channel flow cell cartridge is loaded into the particle separation system.

In some instances, the first magnet may have a polarity that is not aligned with a polarity of the second magnet.

In some instances, the array of magnets may include an array of upper magnets and an array of lower magnets, the multi-channel flow cell cartridge located between the upper and lower magnet arrays when the multi-channel flow cell cartridge is loaded into the particle separation system.

In some instances, the array of upper magnets may be an array of alternating polarity magnets, and the array of lower magnets may be an array of alternating polarity magnets.

BRIEF DESCRIPTION OF FIGURES

FIG. 4 C shows the components of the multi-channel flow cell cartridge of FIGS. 4 A-B prior to assembly.

FIG. 6 B shows the bottom capping film component of the multi-channel flow cell cartridge of FIGS. 4 A-C.

FIG. 6 C shows the collection well capping film component of the multi-channel flow cell cartridge of FIGS. 4 A-C.

FIG. 6 D shows the outlet membrane film component of the multi-channel flow cell cartridge of FIGS. 4 A-C.

FIG. 10 B shows the core of FIG. 10 A in a clamped configuration, with a multi-channel flow cell cartridge clamped between upper and lower clamps of the core.

DETAILED DESCRIPTION

Cells, biological materials, and other types of particles have properties that dictate their behavior when subjected to magnetic levitation. Durmus et al. showed that the height at which a cell levitates in a paramagnetic fluid medium corresponds to cellular density, and that different cell types can be distinguished based on their characteristic magnetic levitation profiles. See Durmus et al., 2015, "Magnetic levitation of single cells," *Proc Natl Acad Sci USA* 112(28): E3661-8; see also co-pending, commonly owned U.S. patent application Ser. No. 17/449,438, filed Sep. 29, 2021 (the entire contents of which are incorporated by reference herein).

Figure 1:
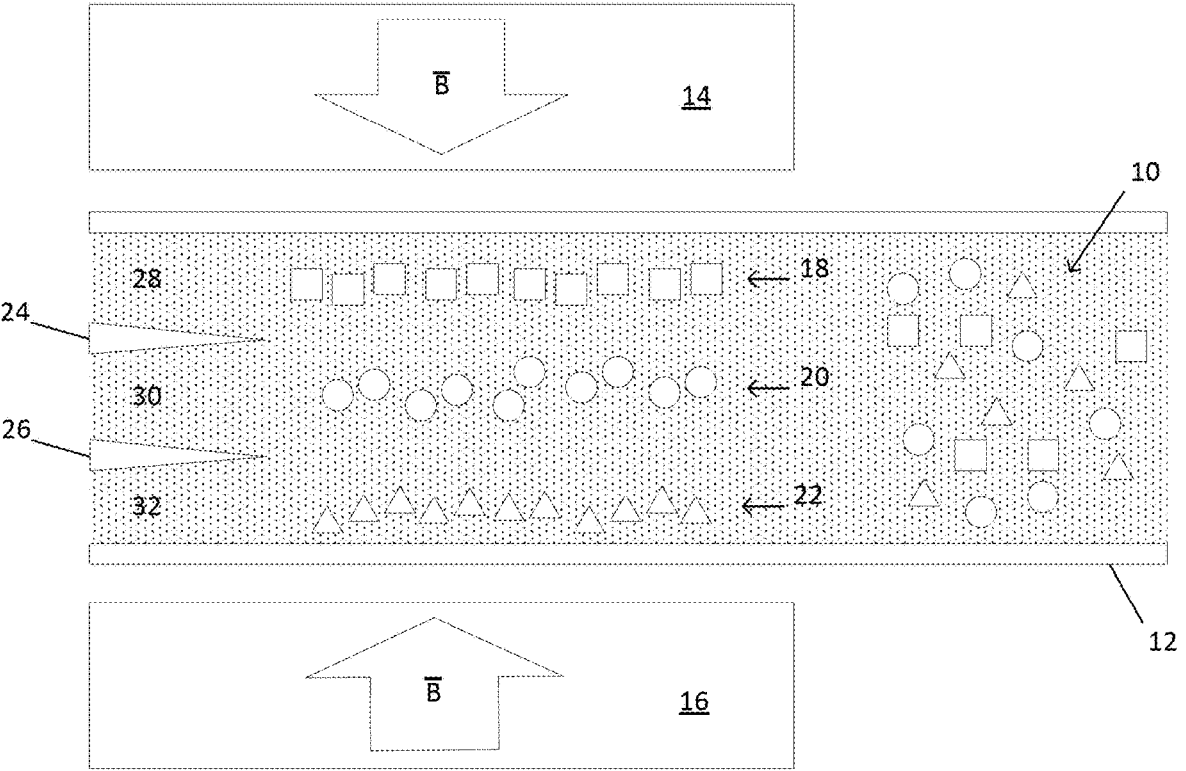
FIG. 1 is a schematic example of particle separation in a fluidic channel by magnetic levitation.

FIG. 1 schematically illustrates one example of particle separation using magnetic levitation. In FIG. 1, a heterogeneous mixture of different types of diamagnetic particles 10 are suspended in a paramagnetic fluid medium within fluid channel 12. The particle mixture is flowed into a region of the fluid channel 12 where magnets 14, 16 subject the particles to a magnetic field gradient.

The magnetic field generates a non-uniform pressure equivalent to the magnetic energy density in the paramagnetic fluid medium. In a magnetic field gradient, diamagnetic particles appear to be repelled from the regions of high magnetic field. In actuality, the diamagnetic particles are displaced by an equal volume of the paramagnetic fluid medium. The attractive interaction between the paramagnetic fluid medium and the regions of high magnetic field can result in the "levitation" of the diamagnetic particles. By applying the magnetic field in such a manner that the force on the diamagnetic particles is opposed by another uniform force (e.g., the force of gravity), a balance is achieved for the diamagnetic particles that are directly related to their densities. In this manner, particles can be separated into separate bands 18, 20, 22 at different levitation heights in accordance with the particles' densities.

Once the particles equilibrate into different bands, they may be separately collected and analyzed. In the example of FIG. 1, dividers 24, 26 separate the fluid channel 12 into distinct parts, in this example collection sub-channels 28, 30, 32, each of which is located to collect a particle band 18, 20, 22 within a particular levitation height range.

Terms and Concepts

The terms and concepts used in this patent disclosure may be further clarified and understood based on the accepted conventions in the relevant fields, as well by the description and figures provided throughout this disclosure.

Separate

As used in this disclosure, the terms "separate," "isolate," "segregate," "purify," "concentrate," and their respective related terms and expressions may be used interchangeably. For example, a particle within a solution may be deemed "separated" if it is segregated from other types of particles within the solution and/or positioned within a defined portion of the solution. In another example, a particle within a solution may be deemed "separated" if, after processing the solution, the concentration of such particle is increased in the solution or within a portion of the solution by a ratio of at least about 100:1, 90:1, 80:1, 70:1, 60:1, 50:1, 40:1, 30:1, 20:1, 10:1, 5:1, 3:1, 2:1, 1.5:1, or 1.1:1. Particles of interest within a solution containing multiple types of particles may be deemed "separated" if, after processing the solution, the ratio of the concentration of the particles of interest to the concentration of other types of particles is increased, or if the ratio of the concentration of the particles of interest to the concentration of other types particles is increased by at least about 10%, 50%, 100%, 200%, 300%, 400%, 500%, 600%, 700%, 800%, 900%, or 1000%, or if the concentration of other particles of the solution (including, but not limited to, the types of particles other than the particles of interest) is decreased by less than about 20%, 15%, 10%, 8%, 6%, 5%, 4%, 3%, 2%, 1%, or 0.5%.

Fluidics

As used in this disclosure, the term "fluidic" refers to a system, device, or element for handling, processing, ejecting, and/or analyzing a fluid sample including at least one "channel." The term "fluidic" includes, but is not limited to, microfluidic and nanofluidic.

Channel

As used in this disclosure, the terms "channel", "flow channel," "fluid channel," and "fluidic channel" are used interchangeably and refer to a pathway on a fluidic device in which a fluid can flow. Channels includes pathways with a maximum height dimension of about 100 mm, about 50 mm, about 30 mm, about 25 mm, about 20 mm, about 15 mm, about 10 mm, about 5 mm, about 3 mm, about 2 mm, about 1 mm, or about 0.5 mm. For example, the channel 12 in FIG. 1 may have cross-sectional dimensions (height by width) of about 10 mm×10 mm, about 10 mm×5 mm, about 10 mm×3 mm, about 10 mm×2 mm, about 10 mm×1 mm, about 10 mm×0.5 mm, about 5 mm×10 mm, about 5 mm×5 mm, about 5 mm×3 mm, about 5 mm×2 mm, about 5 mm×1 mm, about 5 mm×0.5 mm, about 3 mm×10 mm, about 3 mm×5 mm, about 3 mm×3 mm, about 3 mm×2 mm, about 3 mm×1 mm, about 3 mm×0.5 mm, about 2 mm×10 mm, about 2 mm×5 mm, about 2 mm×3 mm, about 2 mm×2 mm, about 2 mm×1 mm, about 2 mm×0.5 mm, about 1 mm×10 mm, about 1 mm×5 mm, about 1 mm×3 mm, about 1 mm×2 mm, about 1 mm×1 mm, about 1 mm×0.5 mm, about 0.5 mm×10 mm, about 0.5 mm×5 mm, about 0.5 mm×3 mm, about 0.5 mm×2 mm, about 0.5 mm×1 mm, or about 0.5 mm×0.5 mm. The internal height and/or width of the channel may be uniform or non-uniform across its cross-section, and geometrically the cross-section may be any shape, including round, square, oval, rectangular, or hexagonal. The cross-section may vary along the length of the channel. The term "channel" includes, but is not limited to, microchannels and nanochannels, and, with respect to any reference to a channel in this disclosure, such channel may be a microchannel or a nanochannel.

Fluidically Coupled

As used in this disclosure, the term "fluidically coupled" or "fluidic communication" means that a fluid can flow between two components that are so coupled or in communication.

Magnetic Levitation

As used in this disclosure, the expression "magnetic levitation," generally involves subjecting diamagnetic, paramagnetic, ferromagnetic, or antiferromagnetic materials suspended in a paramagnetic fluid medium to a magnetic field, such as a magnetic field gradient that forms between two magnets. Magnetic levitation may involve suspending materials in a ferrofluid.

Paramagnetic Fluid Medium

As used in this disclosure, a "paramagnetic fluid medium" includes a paramagnetic material and a solvent. The paramagnetic fluid medium may be biocompatible in at least some implementations, i.e. capable of being mixed with live cells and without significantly impacting on the viability of the cells or their behavior. A paramagnetic material may include one or more of, but not limited to: gadolinium, titanium, vanadium, dysprosium, chromium, manganese, iron, nickel, and gallium, including their ions. For example, a paramagnetic material may include one or more of the following ions: titanium (III) ion, gadolinium (III) ion, vanadium (I) ion, nickel (II) ion, chromium (III) ion, vanadium (III) ion, dysprosium (III) ion, cobalt (II) ion, and gallium (III) ion. In some examples, a paramagnetic material may include a chelated compound, such as, but not limited to, a gadolinium chelate, a dysprosium chelate, or a manganese chelate. In some examples, a paramagnetic material may be one or more of [Aliq]$_2$ [MnCl$_4$], [Aliq]$_3$ [GdCl$_6$], [Aliq]$_3$ [HoCl$_6$], [Aliq]$_3$ [HoBr$_6$], [BMIM]$_3$ [HoCl$_6$], [BMIM] [FeCl$_4$], [BMIM]$_2$ [MnCl$_4$], [BMIM]$_3$ [DyCl$_6$], BDMIM]3 [DyCl$_6$], [AlaCl] [FeCl$_4$], [AlaCl]$_2$ [MnCl$_4$], [AlaCl]$_3$ [GdCl$_6$], [AlaCl]$_3$ [HoCl$_6$], [AlaCl]$_3$ [DyCl$_6$], [GlyC2], or [FeCl$_4$]. A paramagnetic material may be present in the paramagnetic fluid medium at a concentration of at least about 10 mM, 20 mM, 30 mM, 40 mM, 50 nM, 60 mM, 70 mM, 80 mM, 90 mM, 100 mM, 120 mM, 150 mM, 200 mM, 250 mM, 300 mM, 500 mM, 1 M, about 10 mM to about 50 mM, about 25 mM to about 75 mM, about 50 mM to about 100 mM, about 100 mM to about 150 mM, about 150 mM to about 200 mM, about 200 mM to about 250 mM, about 250 mM to about 300 mM, about 300 mM to about 500 mM, or about 500 mM to about 1 M. In one example, the paramagnetic material is gadobutrol, and is present at a concentration of at least about 10 mM, 20 mM, 30 mM, 40 mM, 50 mM, 60 mM, 70 mM, 80 mM, 90 mM, or 100 mM, about 10 mM to about 50 mM, about 25 mM to about 75 mM, or about 50 mM to about 100 mM, or about 10 mM to 1 M. In some instances, the paramagnetic material is present at concentrations up to 10 M. It is understood that, in addition to a paramagnetic material and a solvent, a paramagnetic fluid medium may include other components, such as salts or additives, for example, but not limited to, additives that function to maintain cellular integrity.

Samples

The terms "sample" or "samples," and the related terms and expressions, as used in this disclosure, are not intended to be limiting, unless qualified otherwise. These terms refer to any product, composition, cell, tissue, organism, or other particle of interest. Generally, the terms "sample" or "samples" are not intended to be limited by their source, origin, manner of procurement, treatment, processing, storage or analysis, or any modification. Some examples of the samples are solutions, suspensions, supernatants, precipitates, or pellets. Samples can contain or be predominantly composed of cells or tissues, or can be prepared from cells or tissues. However, samples need not contain cells. Samples may be mixtures of or contain biological molecules, such as nucleic acids, polypeptides, proteins (including antibodies), lipids, carbohydrates etc. Samples may be biological samples. For example, a "sample" may be any cell or tissue sample or extract originating from cells, tissues or subjects, and include samples of animal cells or tissues as well as cells of non-animal origin, including plant and bacterial samples. A sample can be directly obtained from an organism, or propagated or cultured. Some exemplary samples are cell extracts (for examples, cell lysates), suspensions of cell nuclei, liquid cell cultures, cell suspensions, biological fluids (including, but not limited to, blood, serum, plasma, saliva, urine, cerebrospinal fluid, amniotic fluid, tears, pleural effusion, lavage fluid from lungs, or interstitial fluid), tissue sections, including needle biopsies, microscopy slides, frozen tissue sections, or fixed cell and tissue samples. In still other examples, samples my be non-biological samples including non-biological particles.

Exemplary Cell Types and Other Types of Particles for Separation

The particle separation systems and methods described in this disclosure may be used on a wide variety of samples, including a wide variety of cell types. The term "particle" or "particles" as used herein can include cells, organisms, organelles, nuclei, organic material such as organic polymers and proteins, particulates of organic or inorganic compounds as well as particles such as beads, bubbles, and fragments. Example cell types include human cells, non-human animal cells, plant cells, eukaryotic cells (for example, but not limited to, immune cells, endothelial cells, yeasts, and T-cells), prokaryotic cells, including bacteria, etc. Multiple cell types may include dead cells, alive cells, healthy cells, pathological cells, infected cells, transfected cells, or genetically modified cells. Cells separated according to the methods of this disclosure can be directly obtained from an organism (or be an organism itself), or propagated or cultured. Generally, the terms "cell," "cells," "cell type" (or the related terms and expressions) are not intended to be limited by their source, origin, manner of procurement, treatment, processing, storage or analysis, or any modification.

Some non-limiting examples of the cell types that may be suitable for being separated by the methods described in this disclosure are macrophages, alveolar type II (ATII) cells, stem cells (for example, adipocytes or cardiomyocytes), embryonic cells, tumor cells, lymphocytes, red blood cells (erythrocytes), epithelial cells, ova (egg cells), sperm cells, T cells, B cells, myeloid cells, immune cells, hepatocytes, endothelial cells, stromal cells, and bacterial cells. A population of cells that includes multiple cell types may be derived from various types of samples, which are discussed elsewhere in the present disclosure.

Cells can be subject to various treatments, storage or processing procedures before being separated using the systems and processes described in the present disclosure. In other examples, the particle separation systems and processes described herein may be used with cells or particles that have not been dyed, labeled, tagged, or otherwise processed. In other examples, the cells or particles (or certain subsets of cells or particles) in a sample may be associated with density-modifying agents.

Miscellaneous

As used in this disclosure, the terms "a", "an", and "the" can refer to one or more unless specifically noted otherwise. Unless otherwise dictated by context, singular terms shall include pluralities, and plural terms shall include the singular.

The use of the term "or" is used to mean "and/or," unless explicitly indicated to refer to alternatives only, or the alternatives are mutually exclusive, although the disclosure supports a definition that refers to only alternatives and "and/or." As used in this disclosure, "another" can mean at least a second or more.

As used in this disclosure, and unless otherwise indicated, the terms "include," "including," and similar terms (such as "have" or "having") mean including without limitation.

When a numerical range is provided in the present disclosure, the numerical range includes the range endpoints unless otherwise indicated. Unless otherwise indicated, numerical ranges in the present disclosure include all values and subranges, as if explicitly written out.

System Architecture

Figure 2:
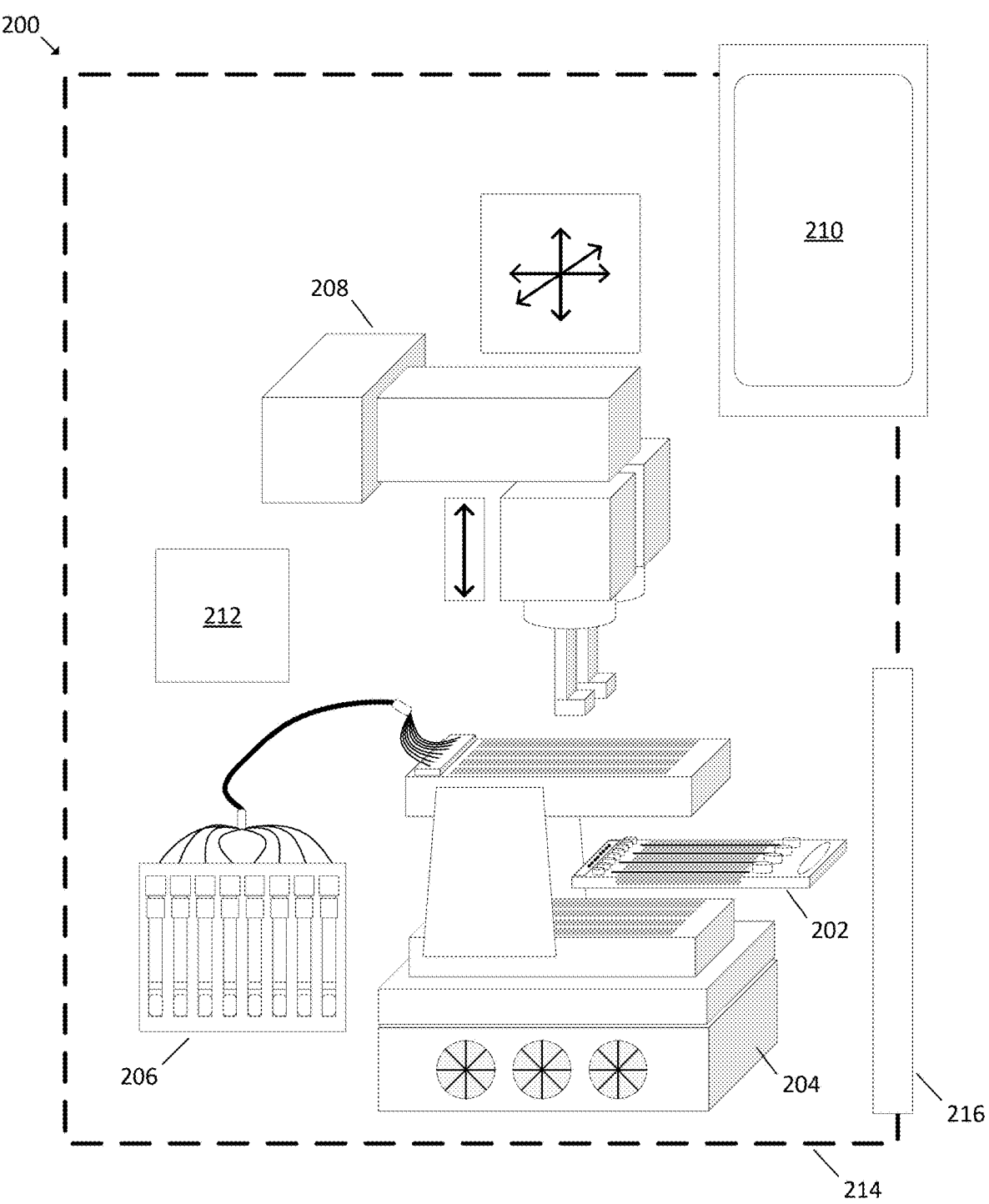
FIG. 2 is an example of a particle separation system.

FIG. 2 is a schematic example of a particle separation system 200. In this example, the particle separation system 200 includes a multi-channel flow cell 202, a core 204, a pumping sub-system 206, an imaging sub-system 208, a user interface 210, and a controller 212. The core 204 is configured to receive and hold the multi-channel flow cell 202, to expose the multi-channel flow cell 202 to magnetic field gradients, to regulate the temperature of the multi-channel flow cell 202, and to fluidically connect the multi-channel flow cell 202 to the pumping sub-system 206. The pumping sub-system 206 is configured to move fluids through the channels of the flow cell 202. The imaging sub-system 208 is configured to image particle separation in the channels of the flow cell 202. The user interface 210 and controller 212 facilitate monitoring and control of the particle separation system 200. The system 200 components are in a housing 214, with an access door 216 allowing for insertion and removal of the multi-channel flow cell 202.

The particle separation system 200 of FIG. 2 is capable of magnetically levitating particles suspended in a paramagnetic fluid medium within the processing channels of the multi-channel flow cell 202. The interaction of the magnetic field with the paramagnetic properties of particles within a paramagnetic fluid medium can either provide a repulsive or attractive effect on the particles to facilitate their separation or concentration. The magnetic field in a magnetic fluid medium is created by magnets, which can be permanent magnets or electromagnets. The maximum energy product of magnets can range from about 1 Mega-Gauss Oersted to about 1000 Mega-Gauss Oersted, or from about 10 Mega-Gauss Oersted to about 100 Mega-Gauss Oersted. The surface field strength of magnets can range from about 0.01 Tesla to about 100 Tesla, or from about 1 Tesla to about 10 Tesla. The remanence of magnets can range from about 0.1 Tesla to about 5 Tesla, or from about 1 Tesla to about 3 Tesla. Magnets can be made from a material comprising neodymium alloys with iron and boron, neodymium, alloys of aluminum with nickel, neodymium alloys with iron, aluminum and cobalt alloyed with iron, samarium-cobalt, other alloys of rare earth elements with iron, alloys of rare earth alloys with nickel, ferrite, or combinations thereof. The magnets in a particle separation system may all be made from the same material or from different materials.

An asymmetric magnetic field can be achieved by using a stronger magnetic material on one side of a fluidic channel of the flow cell and a weaker magnetic material on the opposite side of the flow cell. An asymmetric magnetic field in a channel may be achieved by positioning a magnet closer on one side of a channel than a magnet on the other side. An asymmetric magnetic field can also be achieved by using a magnetic material on one side of the flow cell and a substantially similar magnetic material on the opposite side of the flow cell. Upper and lower magnets may be substantially the same size. In one example, the upper magnets may be neodymium and the lower magnets may be samarium-cobalt. Alternatively, the upper magnets may be samarium-cobalt and the lower magnets may be neodymium. Alternative magnet configurations may be used instead. A magnetic levitation system may include multiple upper magnets and multiple lower magnets positioned around each fluidic channel of a multi-channel flow cell.

Exemplary NdFeB magnetic component dimensions include, for a bottom magnet component about 50×15×2 mm (magnetized through the 15 mm axis), and for a top magnet component 50×5×2 mm (magnetized through the 5 mm axis). Other exemplary magnet dimensions include 60×15×2 mm, 60×5×2 mm, 75×10×3 mm, 75×20×3 mm, and 25×15×2 mm. An exemplary magnet configuration for a separation channel of a multi-channel flow cell includes an upper and lower magnet with dimensions of about 75×10× 3.2 mm, and a spacing between upper and lower magnets of about 2.5 mm, about 3.0 mm, about 3.5 mm, about 2.9 mm, about, 3.0 mm, about 3.1 mm, about 3.2 mm, about 3.3 mm, or about 2.72 mm, about 2.88 mm, about 2.98 mm, about 3.18 mm, about 3.20 mm, or about 3.37 mm.

The pumping sub-system 206 is configured to move fluids through the channels of the flow cell 202. In one particular example, the flow cell 202 includes four separation channels, each of which separates into two sub-channels after separation, and the pumping sub-system includes eight pumps (one for each sub-channel of the flow cell 202). In the particular example shown in FIG. 2, the pumps are syringe pumps, although other pumps could be used. The flow rate in each of the separation channels provided by the pumping sub-system may range from as low as 1 μL per minute to as high as 100 mL per minute during separations. The flow rate may be at or at least about 25 μL per minute, at or at least about 50 μL per minute, at or at least about 100 μL per minute, at or at least about 200 μL per minute, at or at least about 250 μL per minute, at or at least about 300 μL per minute, or from about 300 μL per minute to about 1 mL per minute. The total sample volume flowrate in each separation channel of the flow cell may be about 50 μL/min, about 75 μL/min, about 100 μL/min, about 150 μL/min, about 200 μL/min, about 300 μL/min, or about 600 μL/min. The flow volume split between two outlet channels can be an even split or can range from about 9:1 to 1:9, about 4:1 to about 1:4, about 3:1 to about 1:3 or about 2:1 to about 1:2 or can vary from 1:1 by about 90% or less, 50% or less, or about 40% or less, or about 30% or less, or about 15% or less when in operation in the system embodiments. The system may be configured to vary the flow volume split between the outlet channels associated with each separation channel.

Figure 3:
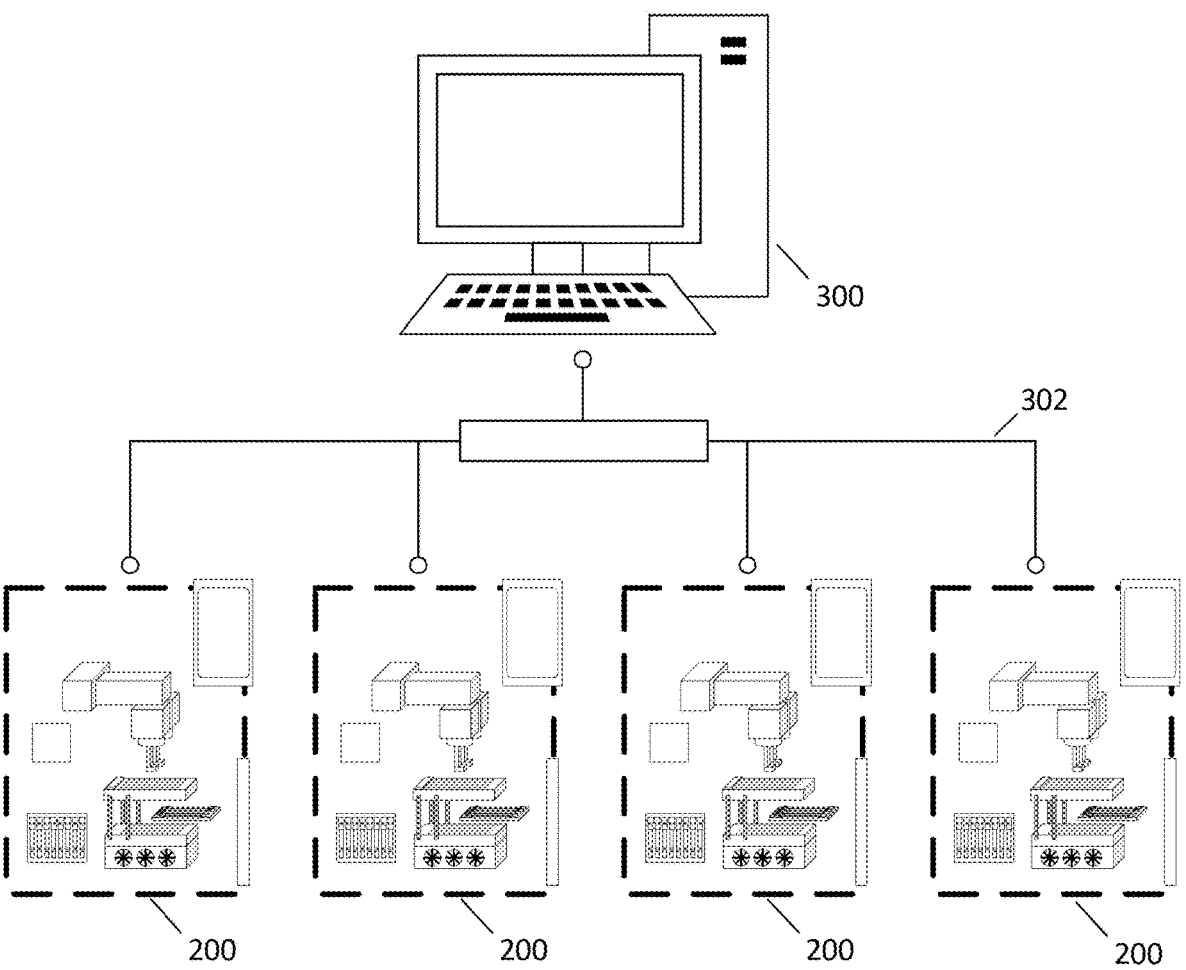
FIG. 3 is an example of a particle separation system including several particle separating devices connected by a computer network.

The particle separation system 200 may be a stand-alone system, or may be centrally monitored and controlled by another computer. FIG. 3 shows one example of several particle separation devices 200 centrally controlled by a computer 300 over a network 302.

Flow Cell

Figure 4A:
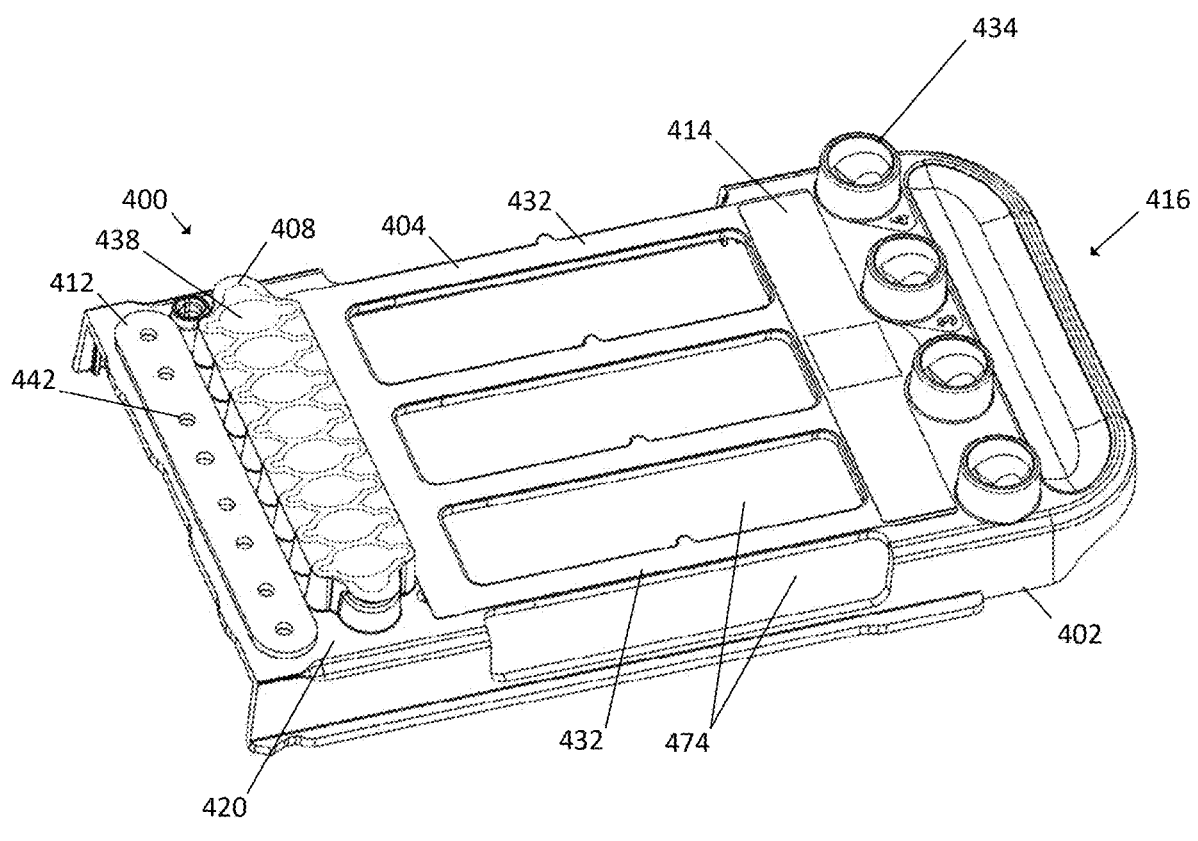
FIGS. 4 A-B show an example of a multi-channel flow cell cartridge.
Figure 4B:
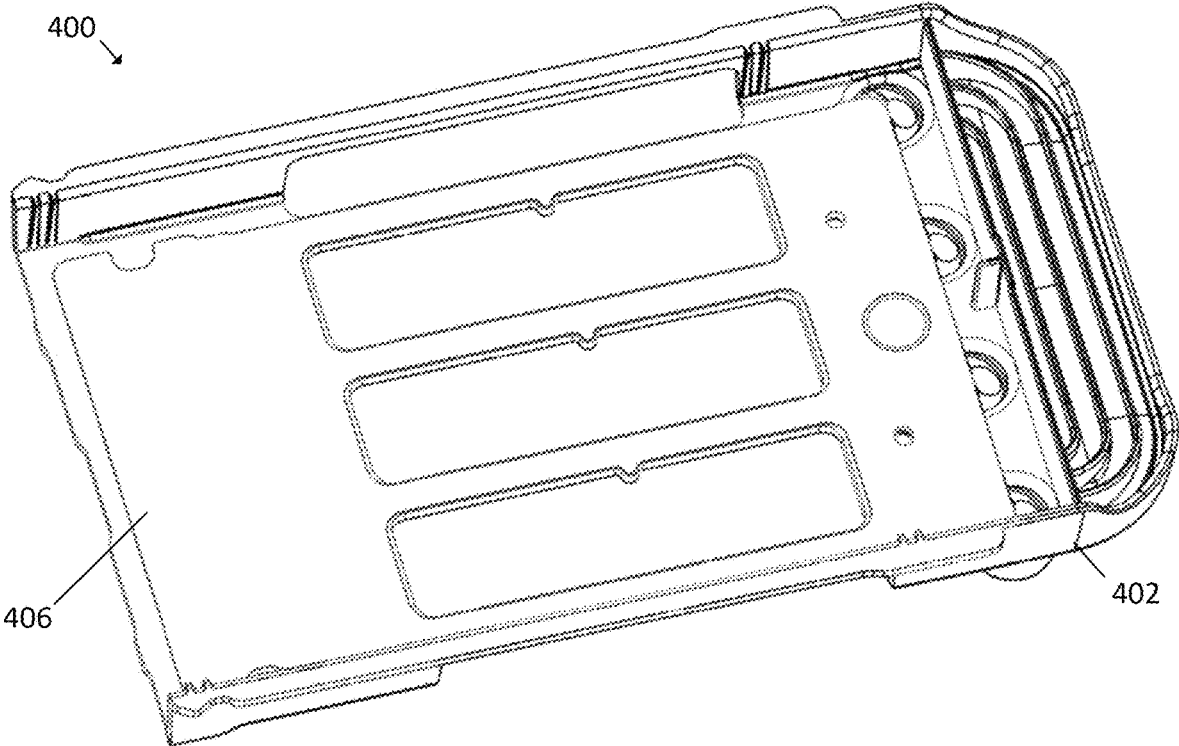
Figure 4C:
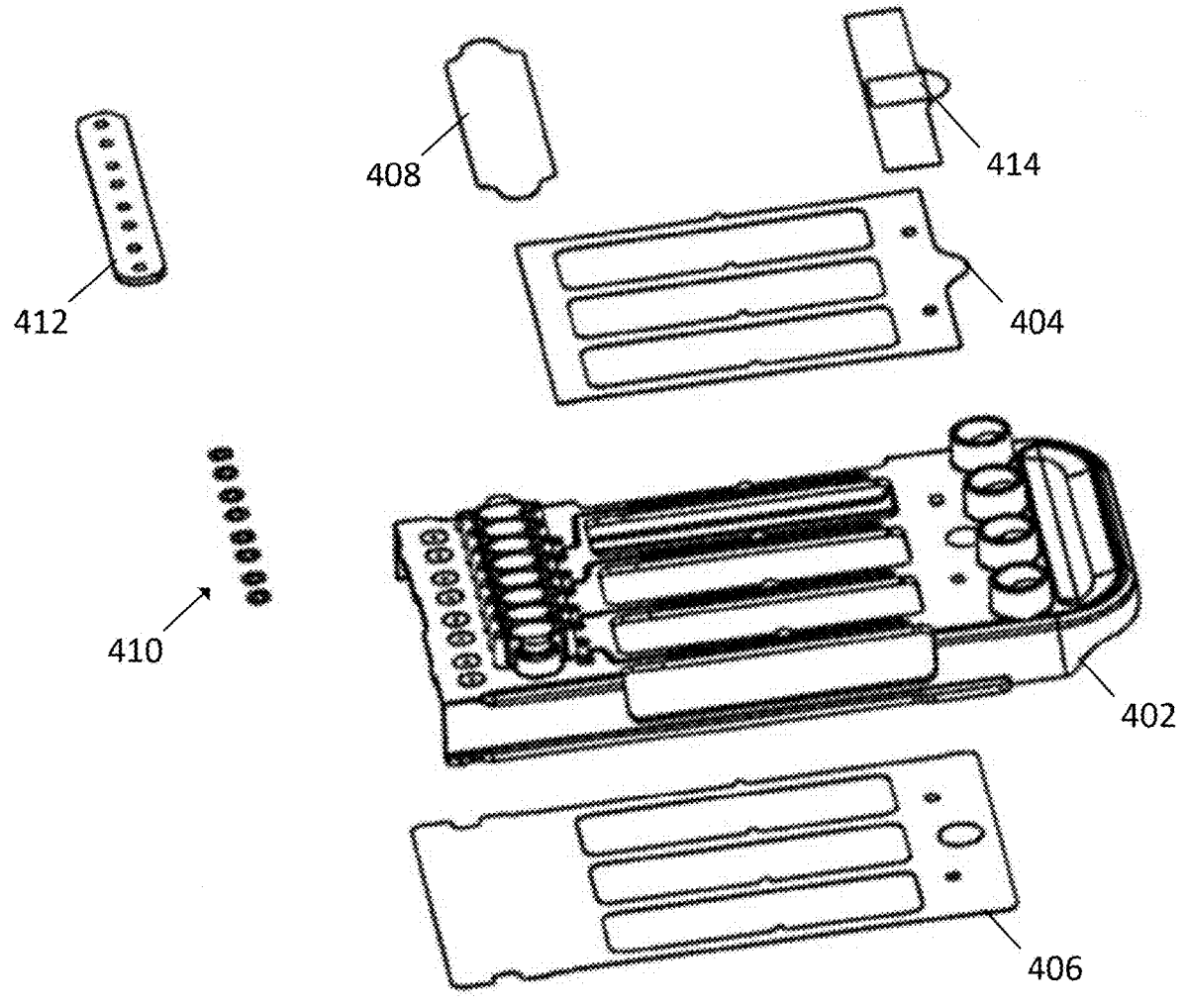

FIGS. 4A and 4B show from the top and bottom one example of a multi-channel flow cell (in this example, a flow cell cartridge), which may be used for the separation of particles. FIG. 4C shows an exploded view of the flow cell cartridge. In the example shown, the flow cell cartridge 400 components include a main body 402, a top capping film 404, a bottom capping film 406, a collection well capping film 408, outlet membranes 410, outlet membrane film 412, and a label 414.

The main body of the flow cell cartridge can be formed by injection molding, etching, laser oblation, machining, or 3D printing. When imaging within the flow cell cartridge is desired, the main body or at least portions of it may be formed of an optically transparent or semi-transparent material. Glass, plastic, or polymer materials including cyclic olefin polymer (COP) or cyclic olefin copolymer (COC) are some non-limiting examples of suitable materials.

The flow cell cartridge 400 includes inlet wells 434 and collection wells 438. Processing channels extending through channel beams 432 fluidically connect the inlet wells 434 to the collection wells 438. As shown in this example, the four processing channels and channel beams are co-planar with one another. The flow cell cartridge also includes collection well outlets 442 fluidically connected to the collection wells 438. Applying negative pressure to the collection well outlets 442 (e.g. by pumping sub-system 206 shown in FIG. 2) draws fluid from the inlet wells 434, through the processing channels in channel beams 432, and into the collection wells 438. The volume of the processing channels can each be from about 10 μL to about 800 μL, from about 50 μL to about 600 μL, 100 μL to about 400 μL, about 150 μL to about 300 μL, at least about 150 μL, at least about 200 μL, at least about 250 μL, or at least about 300 μL. In this particular example, and as discussed in further detail below, each of the processing channels splits into two outlet channels. In some implementations, the combined volume of the outlet channels can be greater that the volume of the processing channel. The flow volume split between two outlet channels can be an even split or can range from about 4:1 to about 1:4, about 3:1 to about 1:3 or about 2:1 to about 1:2 or can vary from 1:1 by about 50% or less, or about 40% or less, or about 30% or less, or about 15% or less when used in exemplary particle separation systems.

As shown in FIG. 4A, openings 474 extend through the flow cell cartridge 400 on both sides of each channel beam 432. Openings 474 facilitate imaging of particles in the processing channels, as discussed in further detail below.

FIGS. 5A-5J show the main body 402 of the flow cell cartridge of FIGS. 4A and 4B. In this particular example, the main body 402 is generally rectangular and defines an inlet end 416 and an outlet end 418 on opposing longitudinal ends of the main body 402. The main body 402 has a top surface 420 and a bottom surface 422 opposite the top surface 422, both extending between the inlet end 416 and the outlet end 418. The main body 402 also includes sidewalls 424 extending downward from the bottom surface 422 to define a cavity on the back side of the flow cell cartridge (see, for example, FIGS. 5C and 5D).

In this example, the sidewalls 424 of the main body 402 include two support beams 426 extending between the inlet end sidewalls 428 and the outlet end sidewalls 430 and parallel to the channel beams 432 (described further below). The support beam 426 are horizontally and vertically offset from the channel beams 432 in order to provide support to the main body and prevent twisting and bending, which in some implementations may be beneficial in maintaining optical alignment during imaging.

In this example, the inlet end 416 includes several inlet wells 434, in this particular example, four inlet wells 434. The inlet wells 434 may extend from the top surface 420 of the main body 402. As shown in the top view of FIG. 5K, the inlet wells 434 may include cylindrical sidewalls. As shown in the top view of FIG. 5E, the cylindrical sidewalls on the inlet wells 434 may be spaced apart from each other. Further, the top surface at the inlet end may include an elongated recess 436 between the cartridge edge and the inlet wells 434. The elongated recess 436 may be designed to provide a handle for a user to manipulate for inserting and removing the flow cell cartridge from a particle separation system.

Figure 5A:
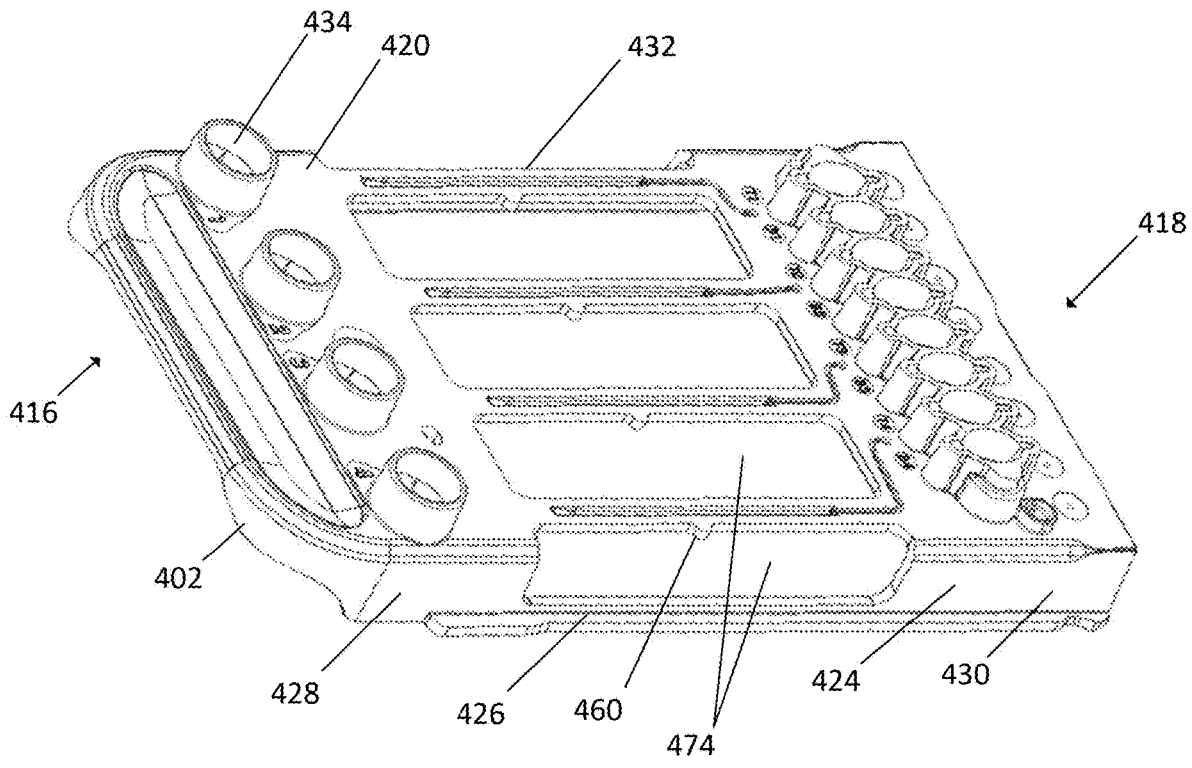
FIGS. 5 A-N show the main body component of the multi-channel flow cell cartridge of FIGS. 4 A-C.
Figure 5B:
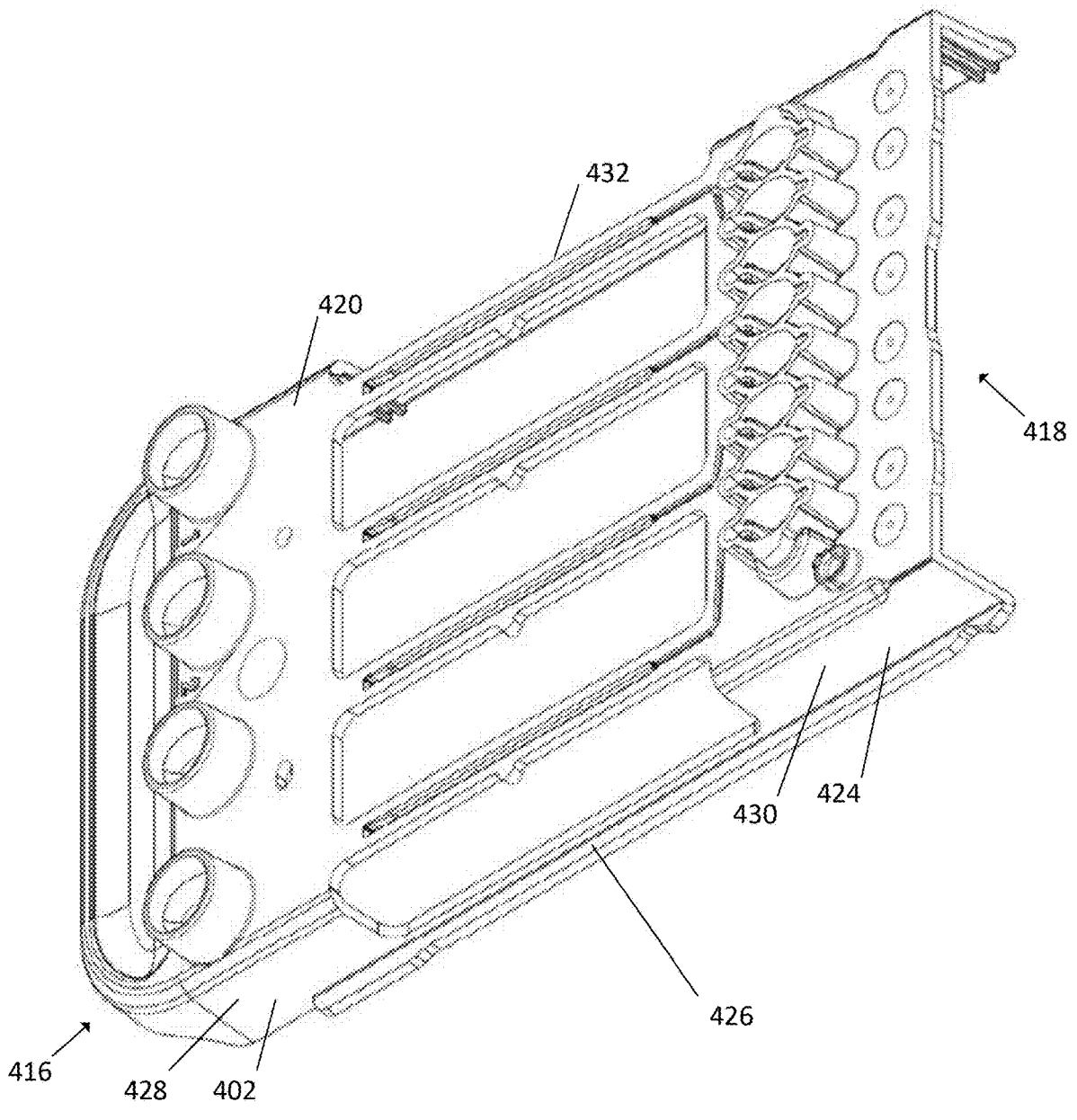
Figure 5C:
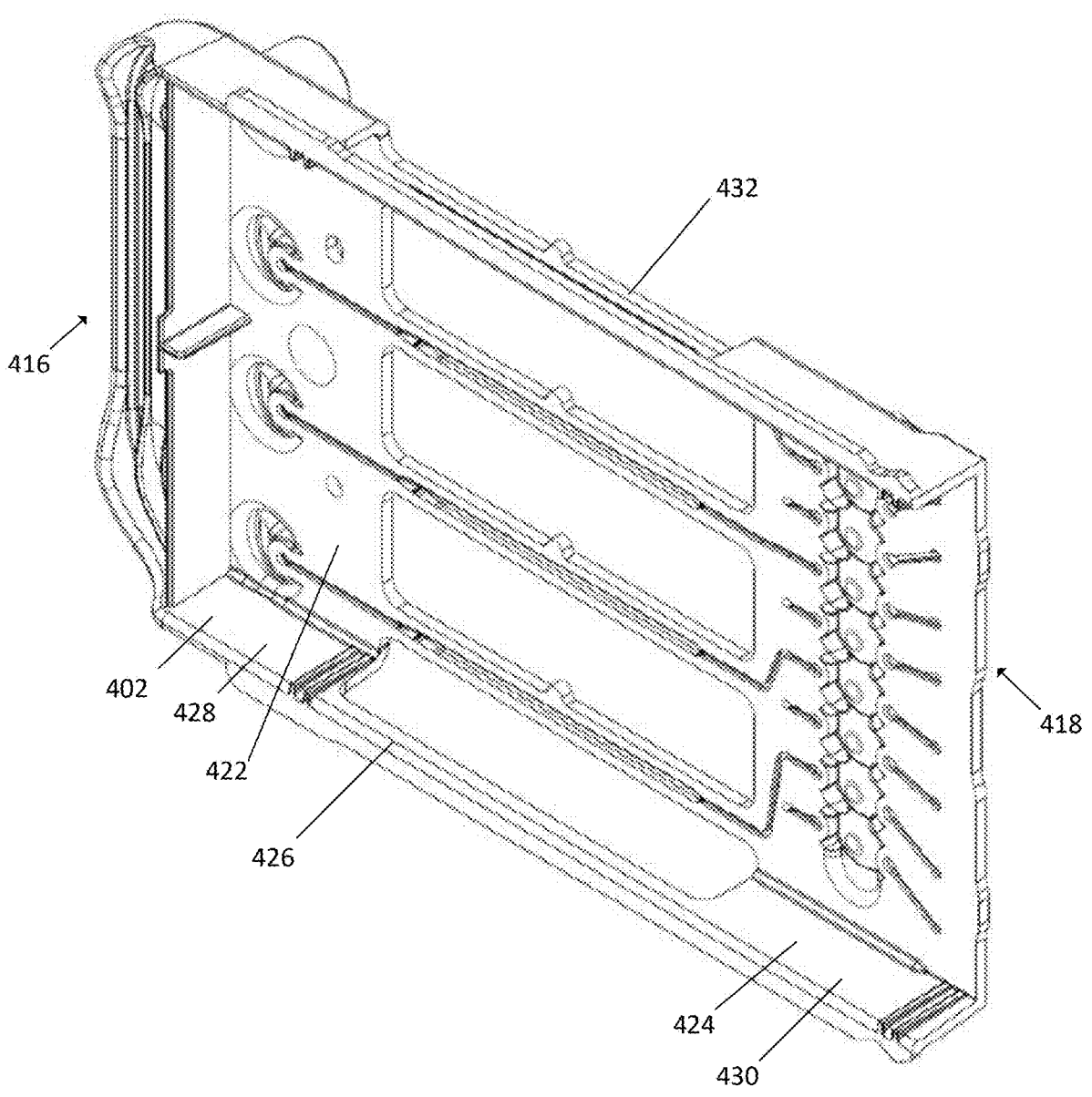
Figure 5D:
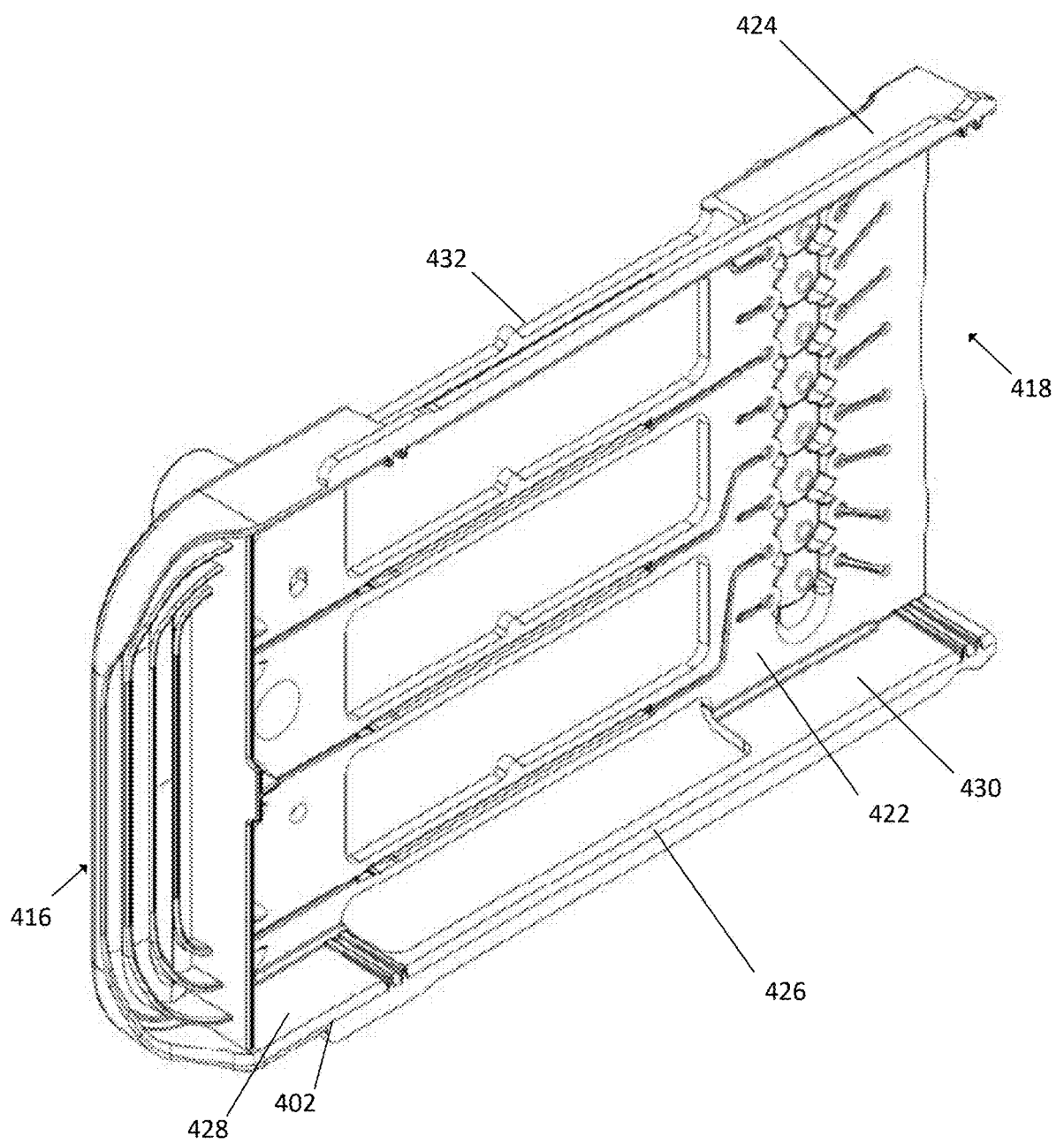
Figure 5E:
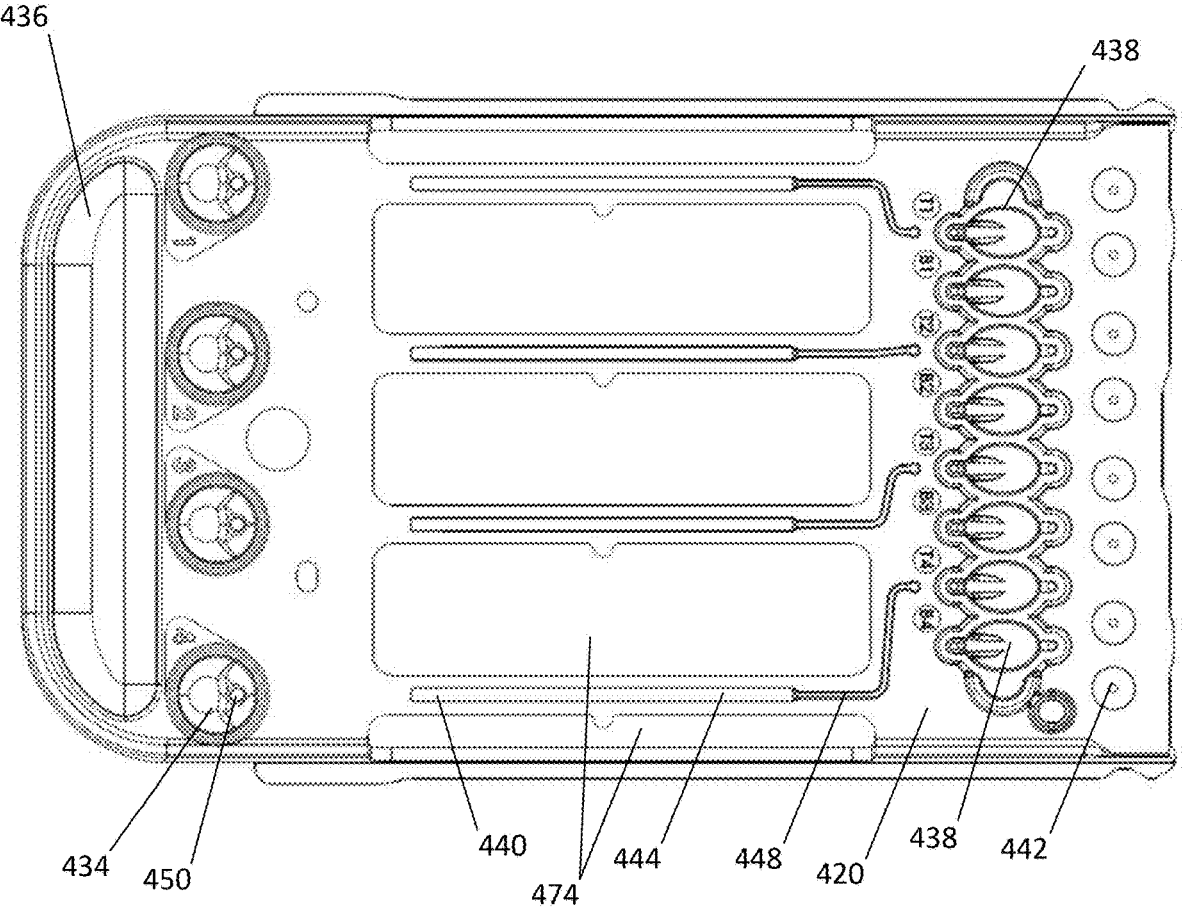

As also shown in the top view of FIG. 5E, the outlet end may include several collection wells 438. In the particular example shown, there are two collection wells 438 for each inlet well 434 and processing channel 440, with an inlet well 434 fluidically coupled to a processing channel 440, which is in turn fluidically coupled to two collection wells 438. In other instances, a flow cell cartridge may include other numbers of inlet and collection wells in other ratios, such as, but not limited to, 1:1, 1:2, 1:3, 1:4, or other ratios. FIG. 1, for example, shows a processing channel that divides into three outlet sub-channels. Returning to FIG. 5E, the collection wells 438 may extend from the top surface 420 of the main body 402. Each pair of two collection wells 438 may be longitudinally aligned with the corresponding inlet well 434, resulting in the spacing between the centers of adjacent collection wells 438 being smaller than the spacing between adjacent inlet wells 434. As shown, the collection wells 438 may be include elliptical sidewalls, as shown in FIG. 5M. Due to the smaller spacing of the collection wells 438 relative to the inlet wells 434, the elliptical sidewalls of the collection wells may be contacting each other.

Further, as shown in FIG. 5E, the top surface 420 at the outlet end 418 may include collection well outlets 442 between an outer edge of the cartridge and the collection wells 438. Each collection well 438 may be fluidically connected to a dedicated collection well outlet 442, as will be discussed in greater detail below.

As shown in FIGS. 5E (top surface) and 5F (bottom surface), each inlet well 434 is fluidically connected to two collection wells 438 by a processing channel 440. Each processing channel 440 includes a processing segment 444 located in a channel beam 432, a segment 446 connecting the inlet well 434 to the processing segment 444, and two segments 448 connecting the processing segment 444 to two collection wells 438.

Figure 5F:
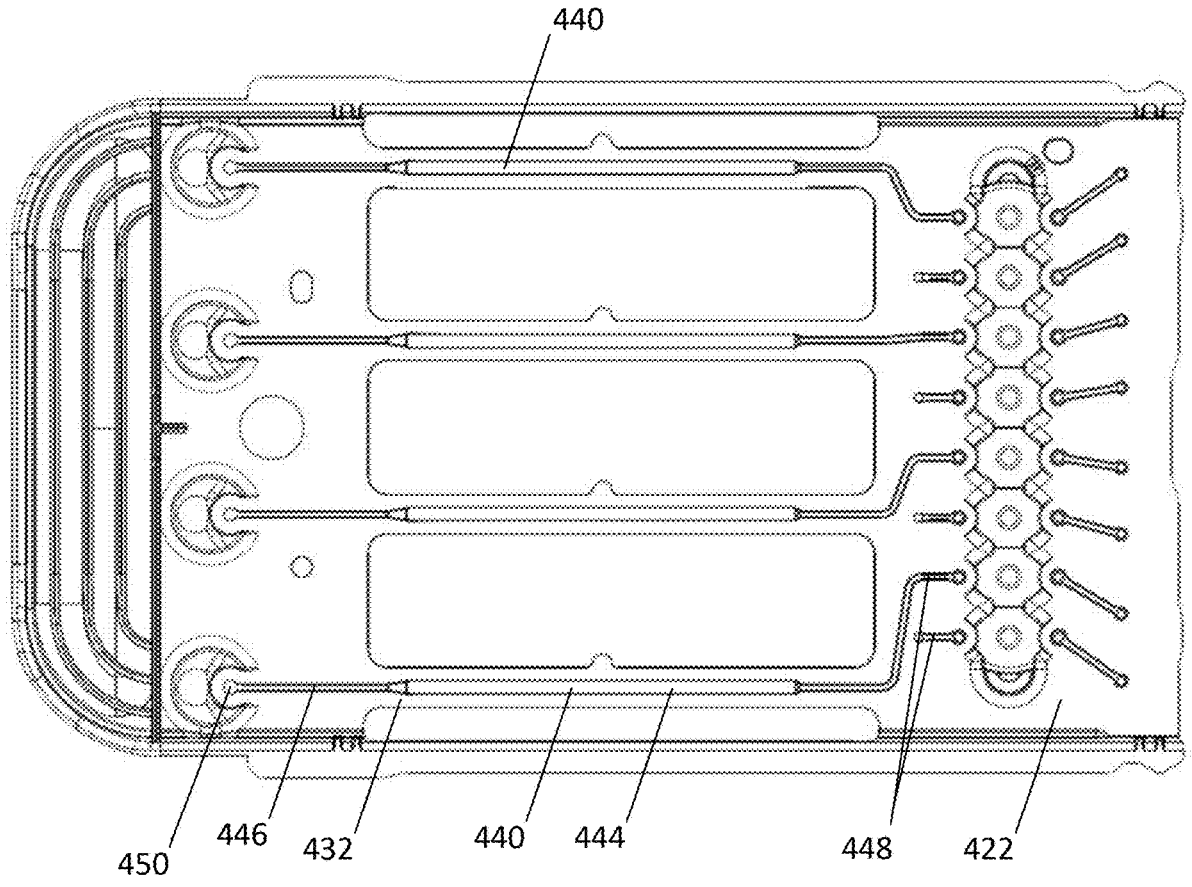
Figure 5G:
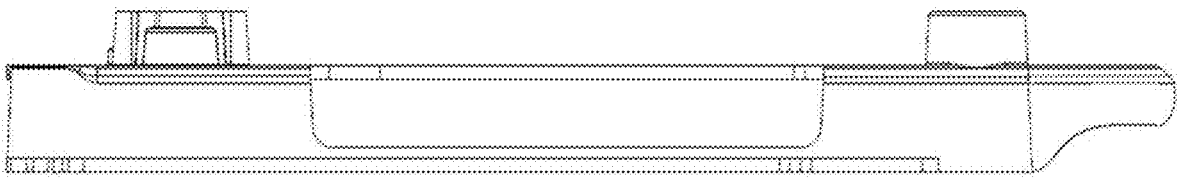
Figure 5H:
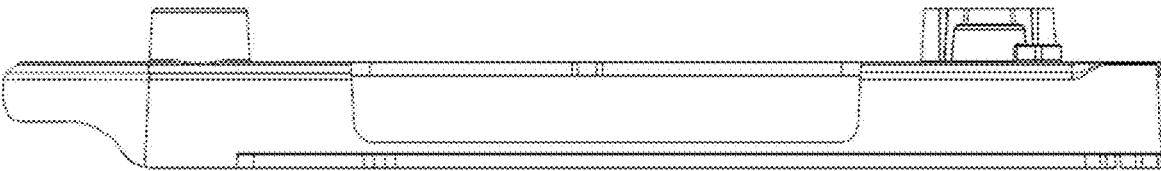
Figure 5I:
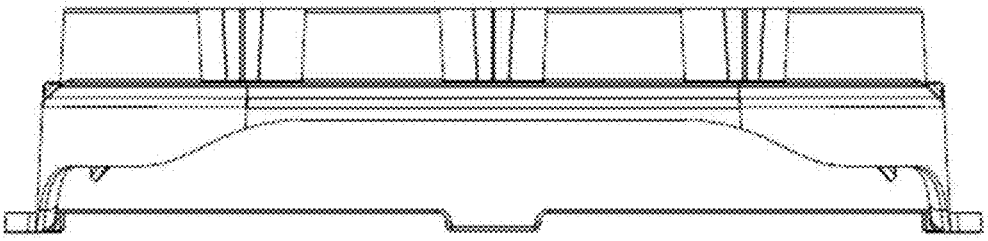
Figure 5J:
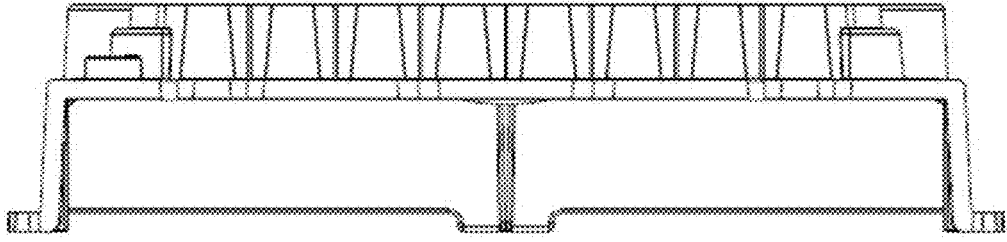
Figure 6A:
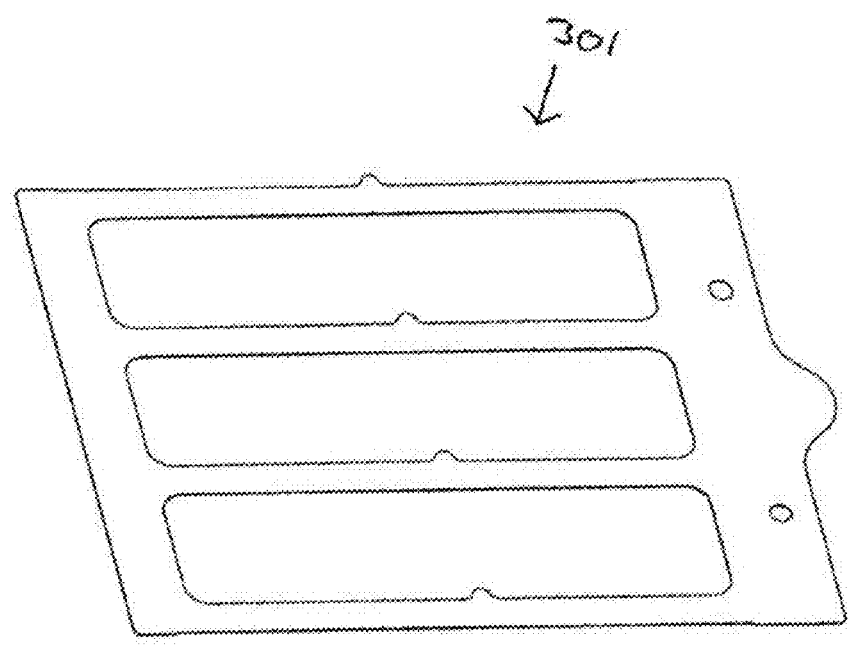
FIG. 6 A shows the top capping film component of the multi-channel flow cell cartridge of FIGS. 4 A-C.
Figure 6B:
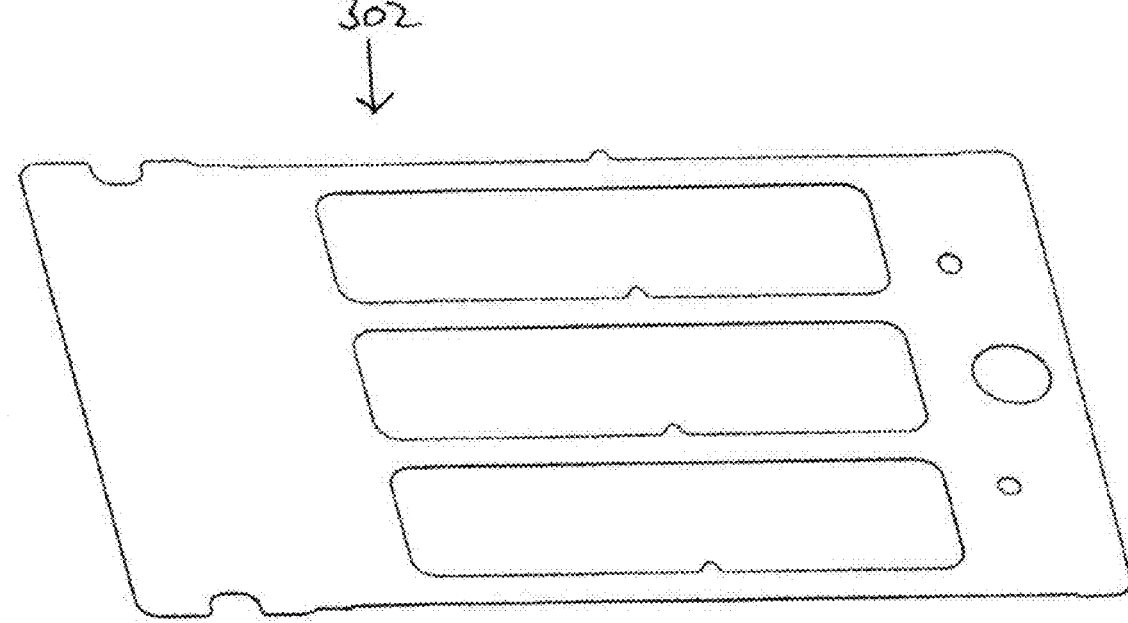
Figure 6C:
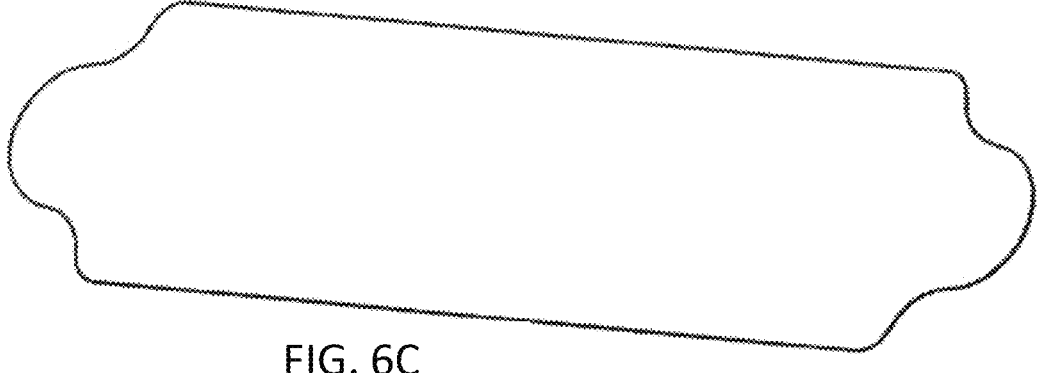
Figure 6D:
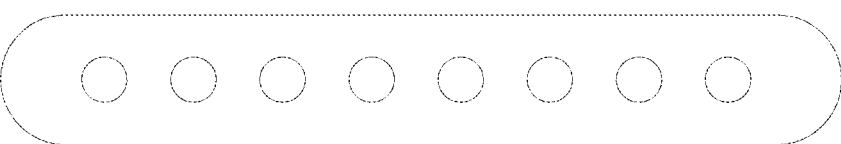
Figure 7:
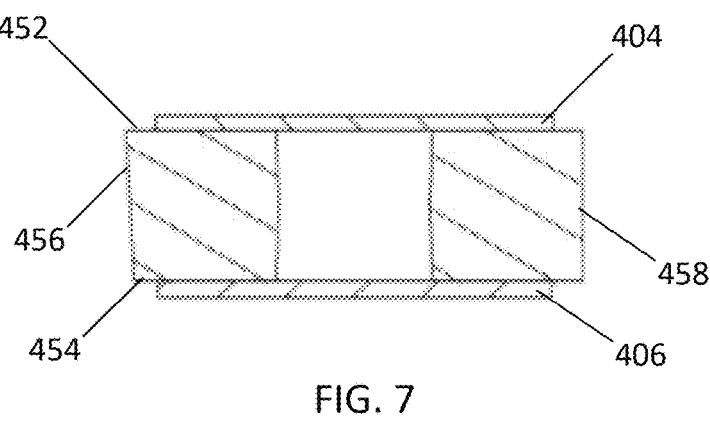
FIGS. 7 and 8 A-B show cross sections of a processing channel of the multi-channel flow cell cartridge of FIGS. 4 A-C.
Figure 8A:
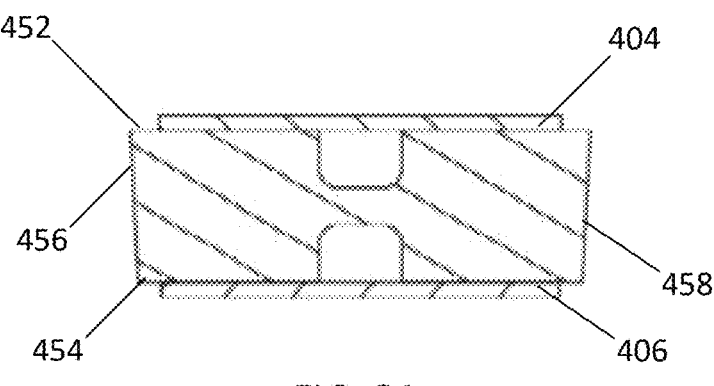
Figure 8B:
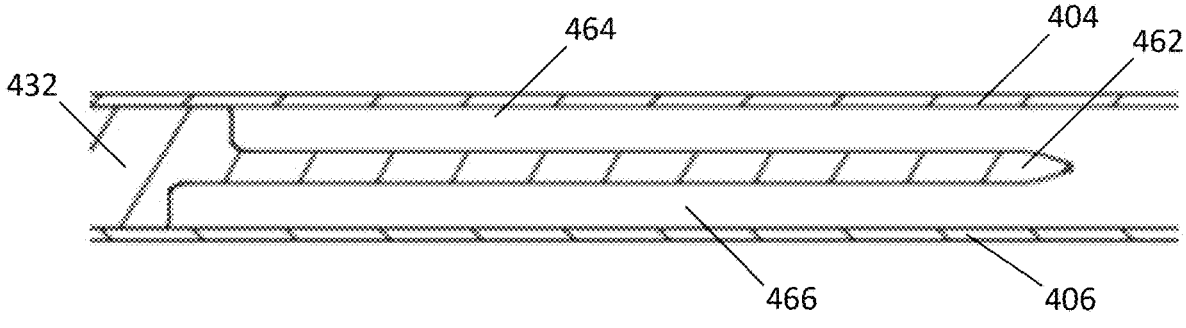

The processing channel 440 is defined by slots in the main body 402, both single open side slots and double open side slots defined in the top surface 420 and the bottom surface 422 of the main body 402, through holes connecting the single open side slots defined the top surface 420 to single open side slots defined in the bottom surface 422, and the capping films 404 and 406 coupled to the top surface 420 and the bottom surface 422 of the main body 402 sealing the open sides of the single and double open side slots. For example, as shown in FIGS. 5E and 5F, a through hole 450 in collection well 434 fluidically connects the collection well 434 to the channel segment 446, which is a single open side slot in the bottom surface 422. Processing segment 444 is a double open slot extending from the top surface 420 to the bottom surface 422 (although, as discussed further below, processing segment 444 may also include one or more internal dividers in portions of it). Segments 448 are also defined by slots in the top and bottom surfaces 420, 422 and through holes extending there through. FIGS. 7, 8A, and 8B show top and bottom capping films 404, 406 sealing slots to form the fluid channels.

As shown in FIGS. 5A-H, the channel beams 432 containing the processing segments 444 of the processing channels 440 may be generally rectangular prism in shape and extend parallel to each other in the longitudinal direction. The channel beams 432 may each define a portion of the top surface 420 and the bottom surface 422 so that the top surface 420 and the bottom surface 422 are contiguous between the inlet end 416 and the outlet end 418. In some implementations, a contiguous top surface 420 and a contiguous bottom surface 422, at least in regions where slots are formed in those surfaces for processing channels 440, may beneficially allow for the top capping film 404 and bottom capping film 406 to form a contiguous seal of the channels 440.

As shown in FIG. 5A, the channel beams 432 may each also include an alignment protrusion 460. In other examples, a channel beam may include more than one alignment protrusion on one or both sides of the channel beam. The protrusions 460 may be engaged by portions of the core to facilitate and/or maintain alignment of the channel beams 432 during use.

FIGS. 7 and 8A show transverse cross-sections of one of the channel beams 432. As shown in FIGS. 7 and 8A, the channel beams 432 each include a channel beam top surface 452, which is a portion of the top surface 420, a channel beam bottom surface 454, which is a portion of the bottom surface 422, a first channel side surface 456, and a second channel side surface 458 opposite the first channel side surface 456. In this example, the main body 402 of flow cell cartridge 400 is formed of a transparent or semi-transparent material (for at least some wavelengths of light), facilitating illumination and/or imaging of the processing channel 440 through the surfaces of the channel beams 432, including the first and second channel side surfaces 456, 458, as will be discussed in greater detail below.

FIG. 8B shows a longitudinal cross-section of a portion of one of the channel beams 432 towards an outlet end of the processing portion 444 of processing channel 440. As shown, a divider 462 may split the processing segment 444 into upper and lower portions 464 and 466 respectively, with fluid flowing along upper portion 464 entering a channel segment 448 extending to one of the collection wells 438 and fluid flowing along lower portion 466 entering a different channel segment 448 extending to a different collection well 438, which will be discussed in greater detail below.

FIGS. 5K and 5L show one of the inlet wells 434 of the flow cell cartridge 400 in more detail. As shown, the inlet well 434 includes through hole 450 for fluidically connecting the inlet well 434 to a processing channel 440. Although not shown in FIG. 5L, when assembled, the bottom capping film 406 forms a seal around each through hole 450 and over the slot defining the channel segment 446 connecting the inlet well 434 to the processing segment 444 of processing channel 440. The interior geometry of the inlet well 434 may define large radius corners and be ramped toward the inlet through hole 450 to facilitate the aspiration of the entirety of the sample and avoid aspiration of bubbles along with the sample. Additionally, the ramp provides guidance to the user to pipette the sample into the appropriate location in the inlet well. In some embodiments, the each inlet channel portion may include a valve, for example a capillary valve in order to prevent unwanted fluid backflow from the processing channel 440 back into the inlet well 434.

FIGS. 5M and 5N show one of the collection wells 438 of the flow cell cartridge 400 in more detail. As shown, the collection well 438 includes a collection through hole 468 extending from the bottom surface 422 of the main body 402 into the interior of the collection well 438. As shown in FIG. 5N, the collection through hole 468 enters the interior of the collection well 438 above the bottom of the collection well 438. The interior geometry of the collection wells 438 includes ramp surfaces 470 configured to direct collected fluid away from the collection through hole 468. The top of the ramp may define a curved edge to avoid fluid pinning and thus retention of the sample at the ramps. These features and the funnel shape of the bottom of the collection well facilitate pipetting for removal of the sample from the collection well.

As shown in FIG. 4A, the collection wells 438 may be sealed on a top edge with capping film 408. In this particular example, sealing the top edge with capping film 408 allows for negative pressure to be applied to the interior of the collection wells, for example via pump, in order to draw fluid through the flow paths into the collection wells. In this example, the negative pressure is applied via the collection well outlets 442, which are fluidically connected to the collection wells, for example at opening 472 shown in FIGS. 5M and 5N. As shown in FIG. 5N, opening 472 connects to collection well 438 above the level where collection through hole 468 connects to collection well 438. The collection wells 438 are configured to reduce if not completely prevent aspiration of fluid from the collection wells into openings 472, thereby reducing if not completely eliminating the risk of cross-contamination of sample from one flow cell cartridge with samples in other flow cell cartridges subsequently used with the particle separation system. The collection wells 438 are configured to retain collected fluid in the well after pumping is complete, so that the fluid can be collected from the well at a later time. In the particular example shown in FIG. 5N, the "up and over" profile of the fluid path, including the location of through holes 468, 472, facilitates retention of collected fluid in the collection well 438. In other examples, the collection wells may be positioned lower in the cartridge body to facilitate retention of fluid in the wells.

As shown in FIG. 4A, the collection well outlets are covered with an outlet membrane film 412. The outlet membrane film 412 may include a gas permeable material, for example PTFE, in order to allow gas to escape while retaining liquid, further reducing if not eliminating risk of liquid from flow cell cartridge 400 entering other components of the particle separation system, while still allowing for negative pressure to be applied to the processing channels via the pumping sub-system of the particle separation system.

The flow cell cartridge 400 described above in this example includes four processing channels 440 defining parallel flow paths, each flow path fluidically connecting an inlet well 434 to two collection wells 438. Each parallel flow path includes a common portion flowing from an inlet well 434, through an inlet through hole 450, through an channel segment 446, then into processing segment 444. From the processing segment 444, the fluid flow path includes two alternative paths, in the example shown, including a first path and a second path. The first path flows above the divider 462 into a channel segment and into a first collection well 438 via a collection through hole 468. The second path flows below the divider 462 into a different channel segment and into a different collection well 438. Accordingly, vertically separating particles of a sample within the processing channel segment 444, and flowing the sample out of the processing channel segment 444 allows for the separated sample to be separately collected in different collection wells 438.

Core

Figure 9:
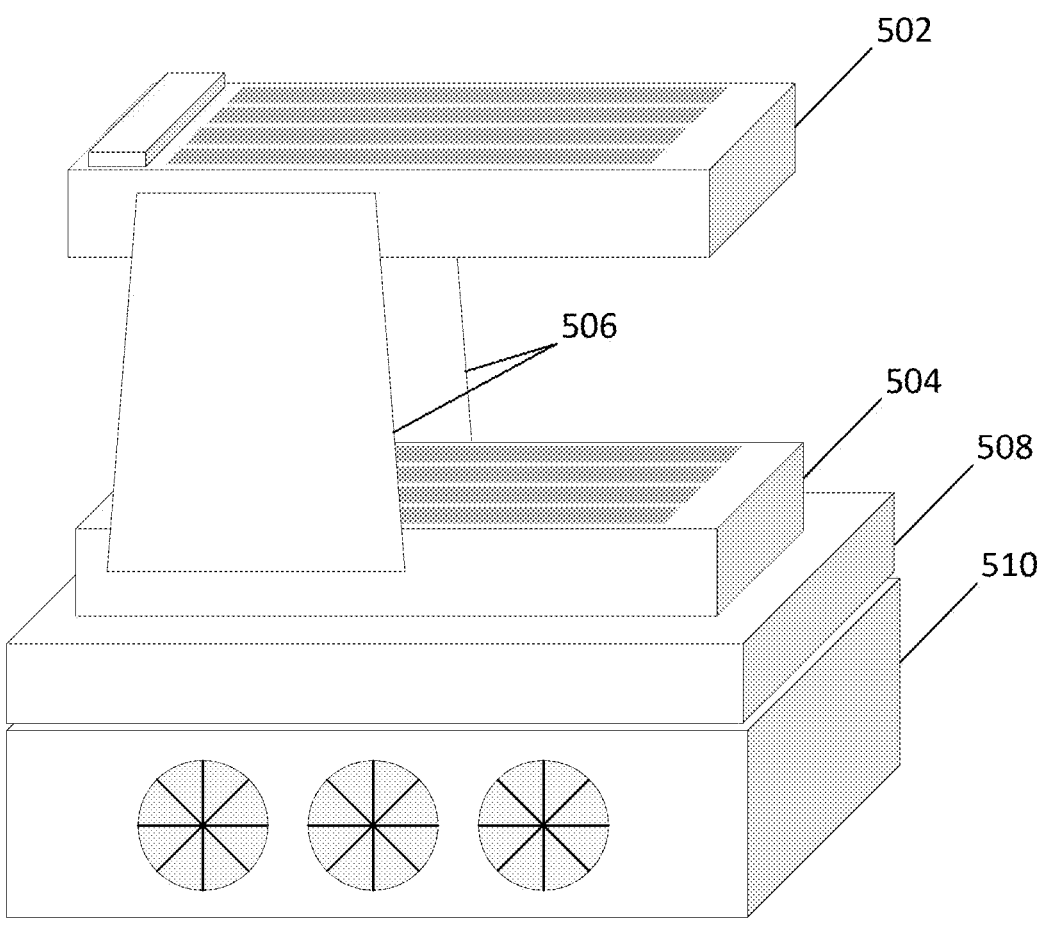
FIG. 9 is a schematic example of a core of a particle separation system.

FIG. 9 shows the core 204 from the schematic example of FIG. 2. In this example, the core includes a holder configured to receive and hold a flow cell. In particular, the core includes an upper clamp 502, a lower clamp 504, clamp plates 506, a temperature control plate and thermoelectric cooler 508, and a heatsink and fan unit 510. Each of these components are discussed in further detail below.

Figure 10A:
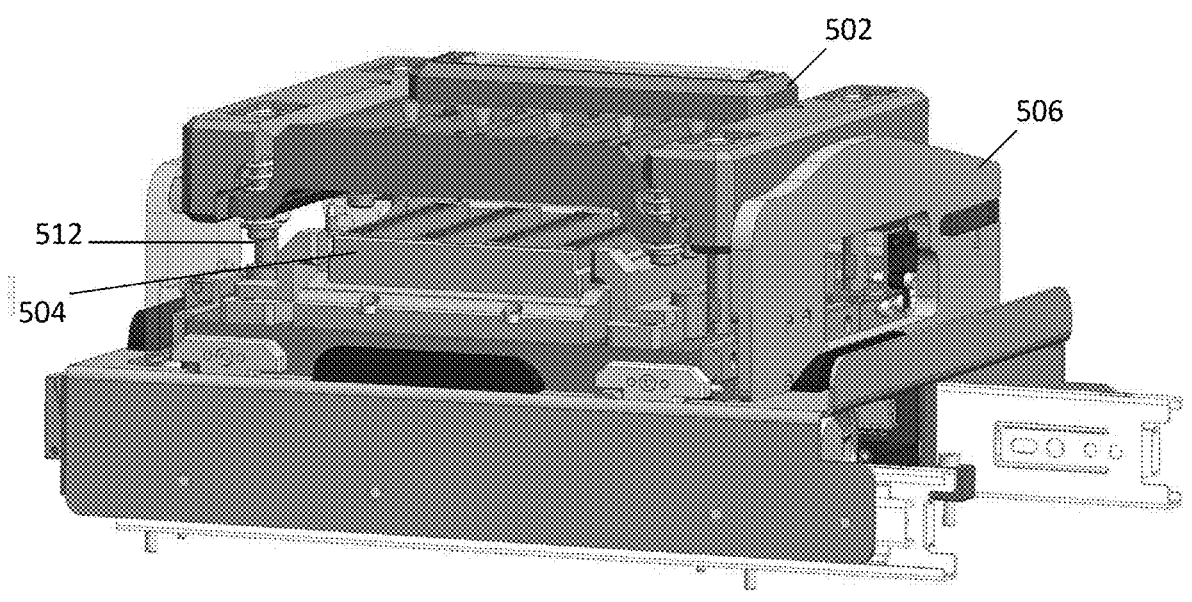
FIG. 10 A shows another example of a core of a particle separation system, shown in an unclamped configuration.
Figure 10B:
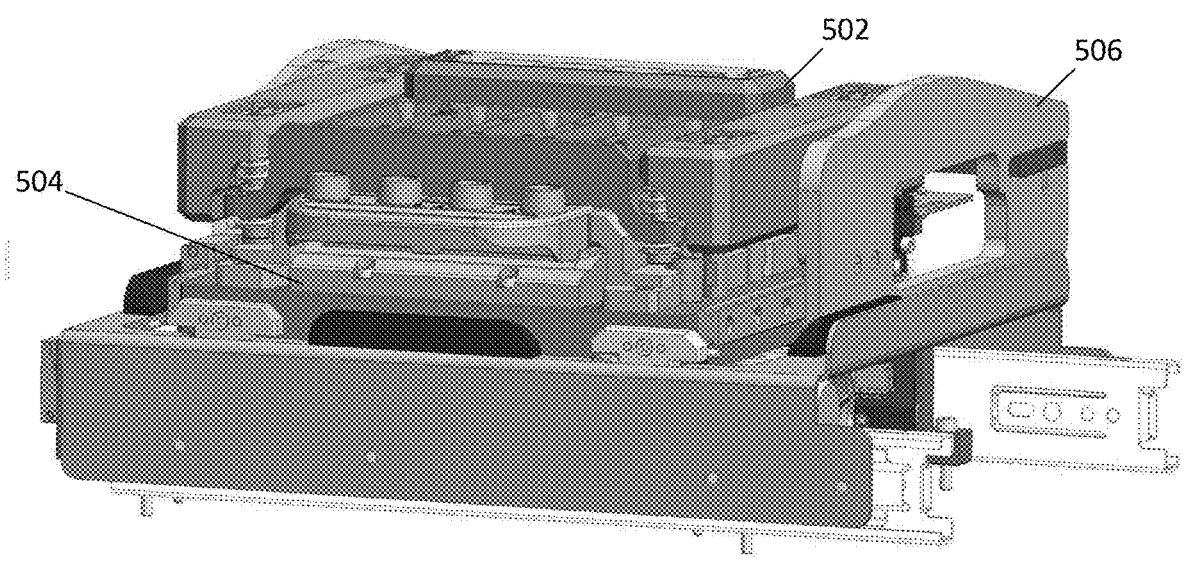

The upper and lower clamps 502, 504 are configured to receive and secure a flow cell cartridge between them (such as the flow cell cartridge 400 of FIG. 4A), with clamp plates 506 guiding the movement of the upper clamp 502 between clamped and unclamped positions. FIGS. 10A-B show another example of a core, with the upper clamp 502 in unclamped (FIG. 10A) and clamped (FIG. 10B) positions. The upper clamp 502 is slidably mounted on four posts 512 (see also FIG. 11, which shows the core without the upper clamp), such that it can translate along a vertical axis between clamped and unclamped positions. The upper clamp 502 also includes pins 544 (not shown in FIGS. 10A-B, see FIG. 14 instead) that extend outwardly from sides of the upper clamp 502 into interior cam tracks in the clamp plates 506. In other implementations, pins 544 may be replaced by roller bearings.

Figure 11:
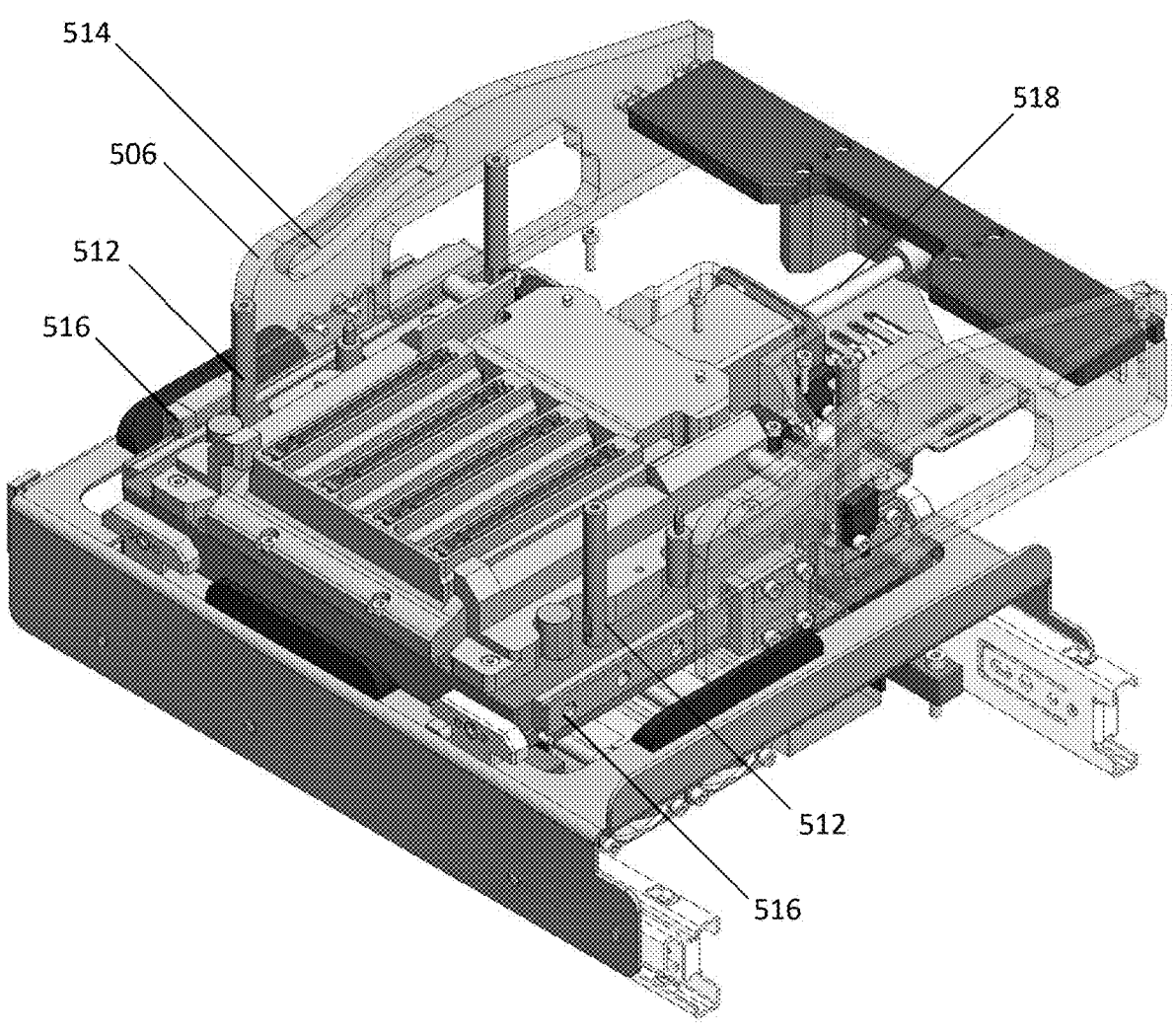
FIG. 11 shows the core of FIGS. 10 A-B, with the upper clamp component of the core removed.

FIG. 11 shows the core from FIGS. 10A-B with the upper clamp 502 removed and the core otherwise partially disassembled such that interior cam track 514 in one of the clamp plates can be seen. As can be seen in FIG. 11, the cam tracks 514 are inclined from an upper portion to a lower portion. As can also be seen in FIG. 11, clamp plates 506 are mounted on slides 516 such that clamp plates 506 can translate along a horizontal axis. Linear actuator 518 controls the horizontal position of the clamp plates 506. The upper clamp 502 can be moved from the unclamped position of FIG. 10A to the clamped position of FIG. 10B by activating linear actuator 518 to move clamp plates 506 rearward along a horizontal axis. As the clamp plates 506 move rearward, the inclined cam tracks 514 interact with the pins 544 on upper clamp 502 to push upper clamp 502 downwardly on posts 512, vertically translating upper clamp 502 to the clamped position.

Figure 12:
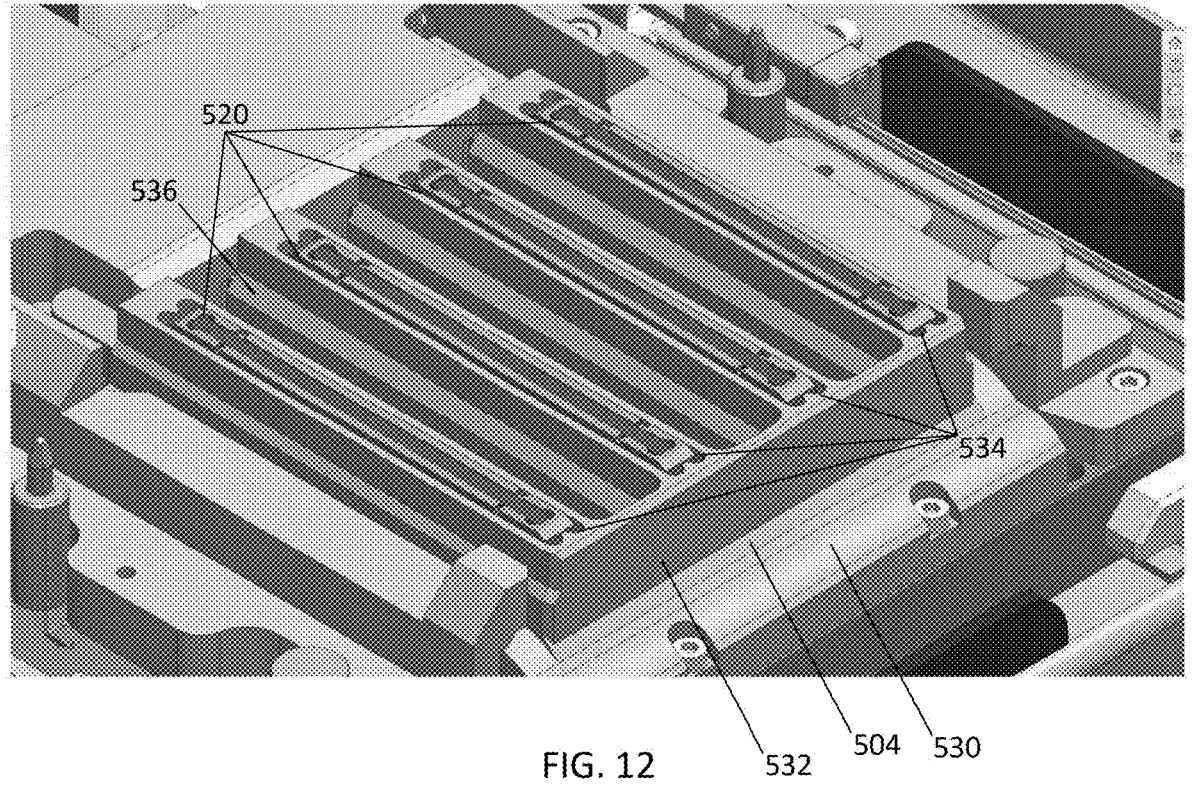
FIG. 12 shows in more detail portions of the lower clamp of the core of FIGS. 10 A-B.
Figure 13:
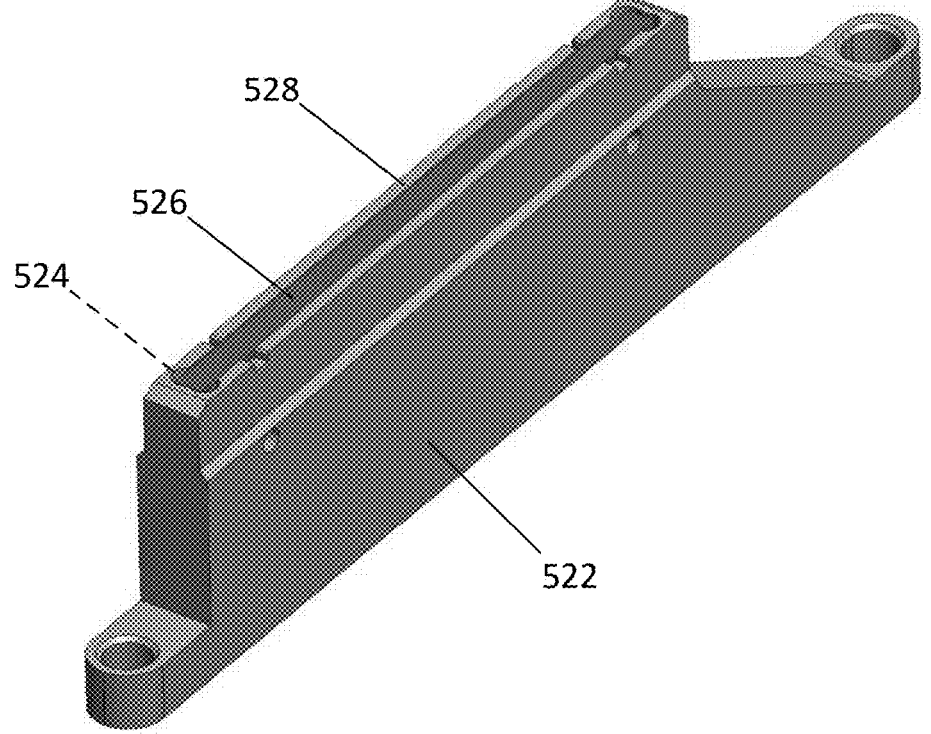
FIG. 13 shows a pillar body and magnet of the lower clamp of the core of FIGS. 10 A-B.

FIG. 12 shows part of the lower clamp 504 of the core of FIGS. 10-11 in more detail. In this example, the lower clamp 504 includes four magnet pillar assemblies 520 that are sized and located to correspond to the four channel beams 432 of the flow cell cartridge 400 shown in FIGS. 4A-B. FIG. 13 shows one of the magnet pillar assemblies 520 removed from the rest of the lower clamp 504. Each magnet pillar assembly 520 includes a pillar body 522 including a slot 524 for receiving a magnet 526. The pillar body 522 has a flat top surface 528 that contacts the underside of a channel beam 432 when a flow cell cartridge 400 is installed and clamped into the core. The pillar body 522 may be formed of a thermally conductive material (such as aluminium, copper, silver, alloys of copper, alloys of aluminium, or a multilayer construction with a conductive outer layer) to facilitate temperature regulation as discussed in additional detail below.

Returning to FIG. 12, the pillar assemblies 520 are surrounded by lower clamp body 530. A portion of lower clamp body 530 defines a pedestal 532 that is shaped and sized to fit inside of the cavity on the back side of flow cell cartridge 400 shown in FIGS. 4A-B. The tops of pillar assemblies 520 extend through openings 534 in lower clamp body. In this particular example, the tops of the pillar assemblies 520 are located slightly above the uppermost surfaces of lower clamp body 530 such that, when a flow cell cartridge is positioned on pedestal 532, the tops of the pillar assemblies 520 contact the undersides of the channel beams of the flow cell cartridge 400 and the uppermost surfaces of the lower clamp body 530 do not contact the channel beams. In this particular example, and as shown in FIG. 13, the tops 528 of the pillar bodies are also located slightly above the uppermost surfaces of the magnets 526. In this particular example, when a flow cell cartridge with four processing channels is positioned and clamped between upper and lower clamps 502, 504, each of the magnets 526 will be located directly underneath one of the processing channels.

The openings 534 in the lower clamp body 530 are larger than the pillar bodies 522 positioned inside those openings 534, defining air channels around the pillar bodies 522 to further facilitate temperature regulation as discussed in additional detail below.

While not specifically referenced in the figures, the pillar bodies 522 and/or the lower clamp body 530 and/or other parts of the lower clamp may include set screws or other components for fine tuning and adjusting the positions of the magnets 526.

As shown in FIG. 12, the body 530 of the lower clamp 504 includes slots 536 between each of the portions of the body 530 where the magnet pillar assemblies 520 are located. As discussed in additional detail below, the slots provide clearance and access for portions of an imaging sub-system.

Figure 14:
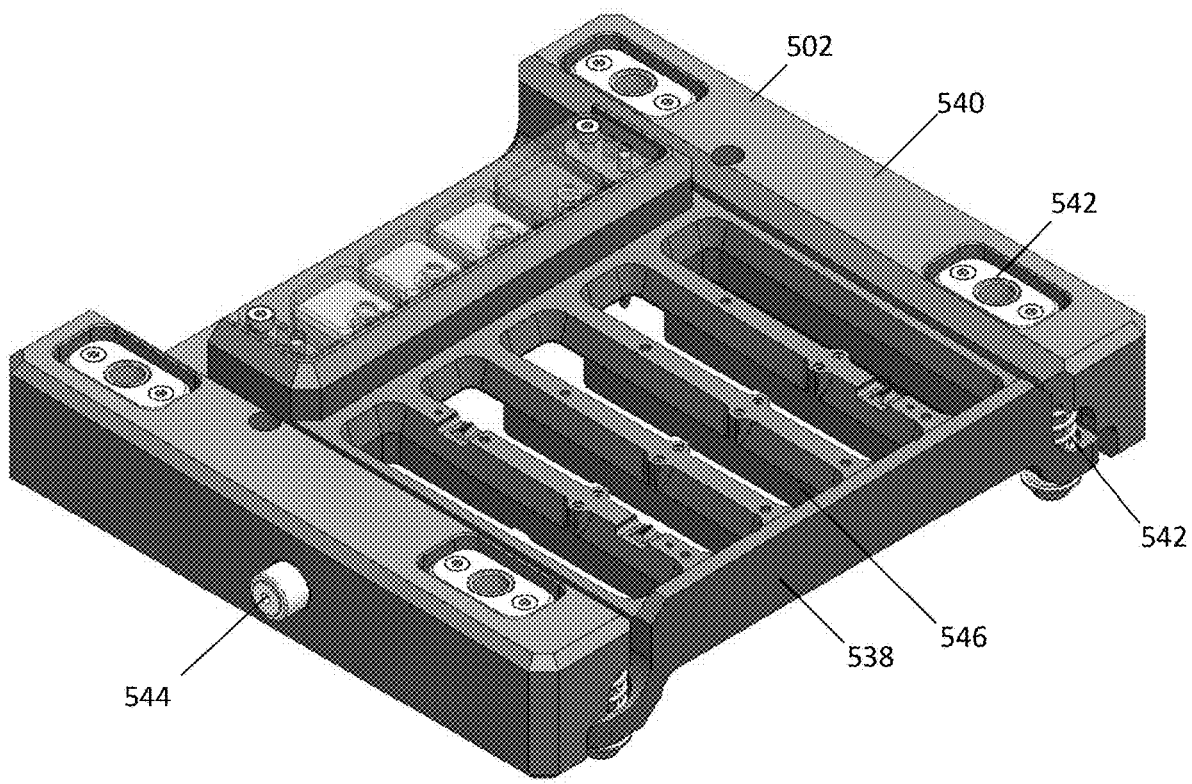
FIG. 14 shows the upper clamp of the core of FIGS. 10 A-B.

FIG. 14 shows the upper clamp 502 of the core of FIGS. 10-11 in more detail, from a topside of the upper clamp 502. Upper clamp 502 includes an upper clamp body 538 supported by carrier 540. In this example, resilient elements 542 (e.g. coil springs) between the carrier and the upper clamp 502 bias the upper clamp body 538 downwardly, away from the carrier, to facilitate uniform clamping of the flow cell cartridge even if there are dimensional variations in the manufactured cartridge. The carrier 540 includes slide bearings 542 for receiving and allowing upper clamp 502 to translate vertically along posts 512. FIG. 14 also shows the pins 544 that are received in cam tracks 514 in the clamp plates 506.

As shown in FIG. 14, upper clamp body 538 includes openings 546 extending through the clamp body, from its top surface to its bottom surface. As discussed in additional detail below, the openings 546 provide clearance and access for portions of an imaging sub-system.

Figure 15:
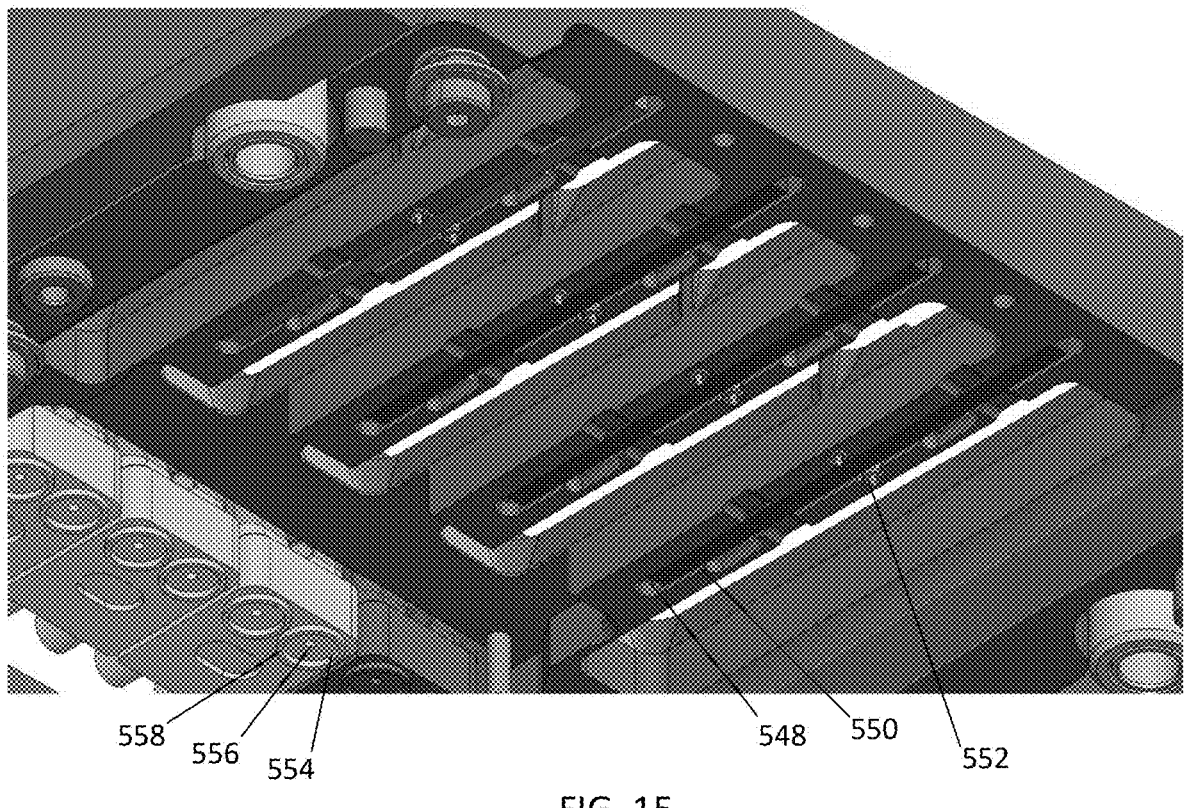
FIG. 15 shows the underside of the upper clamp of FIG. 14.

FIG. 15 shows a close up of a portion of the upper clamp 502 from the underside. The lower clamp body includes openings 548 for receiving magnets 550. In this particular example, when a flow cell cartridge with four processing channels is positioned and clamped between upper and lower clamps 502, 504, each of the magnets 550 will be located directly over one of the processing channels. As with the lower clamp 504, the upper clamp 502 may include set screws or other components for fine tuning the position of each of the magnets 550.

The upper clamp body 538 shown in FIG. 15 includes resilient contacts 552 positioned and configured to contact alignment features on a flow cell cartridge (e.g. protrusions 460 shown in FIG. 5A) to facilitate clamping the flow cell cartridge flat and otherwise accurately seating it between upper and lower clamps. In the particular example shown, the resilient contacts 552 are spring plungers with contact ends biased downwardly. In the particular example shown, when a flow cell cartridge is clamped between the upper and lower clamps 502, 504, bottom ends of the resilient contacts 552 contact one or more of the protrusions on the flow cell cartridge proximate the processing channels, and the magnets 550 and surrounding portions of the upper clamp body 538 are positioned just above, but not in contact, with the upper surfaces of the flow cell cartridge proximate its processing channels.

As also shown in FIG. 15, the upper clamp body 538 also includes a series of fluidic connection ports 554 positioned and configured to fluidically connect a flow cell cartridge to a pumping sub-system. In this particular example, each connection includes a port opening 556 surrounded by a raised sealing ring 558.

Figure 16:
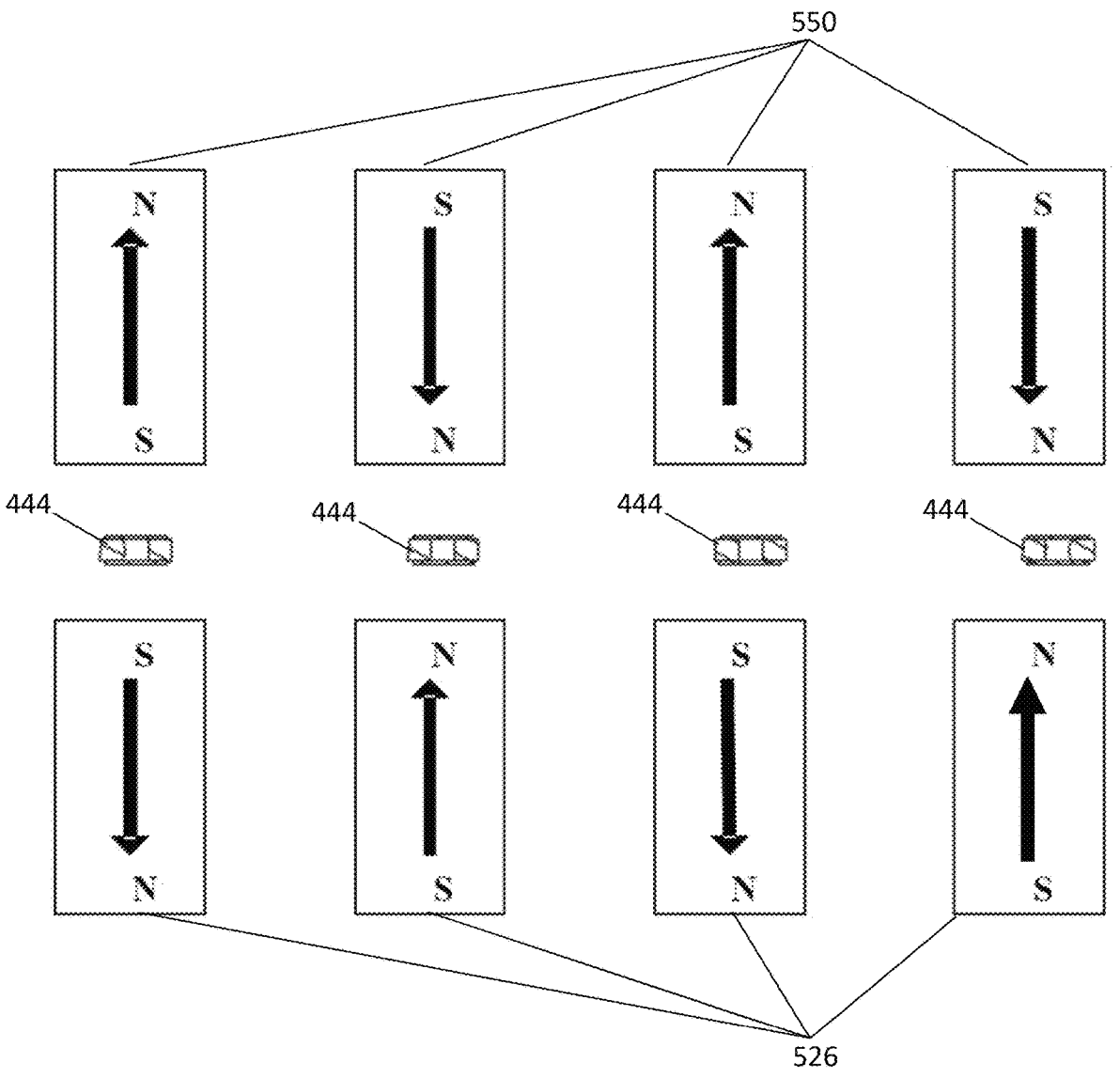
FIGS. 16 and 17 schematically illustrate an example of a magnet array of a particle separation system in relation to processing channels of a flow cell cartridge.
Figure 17:
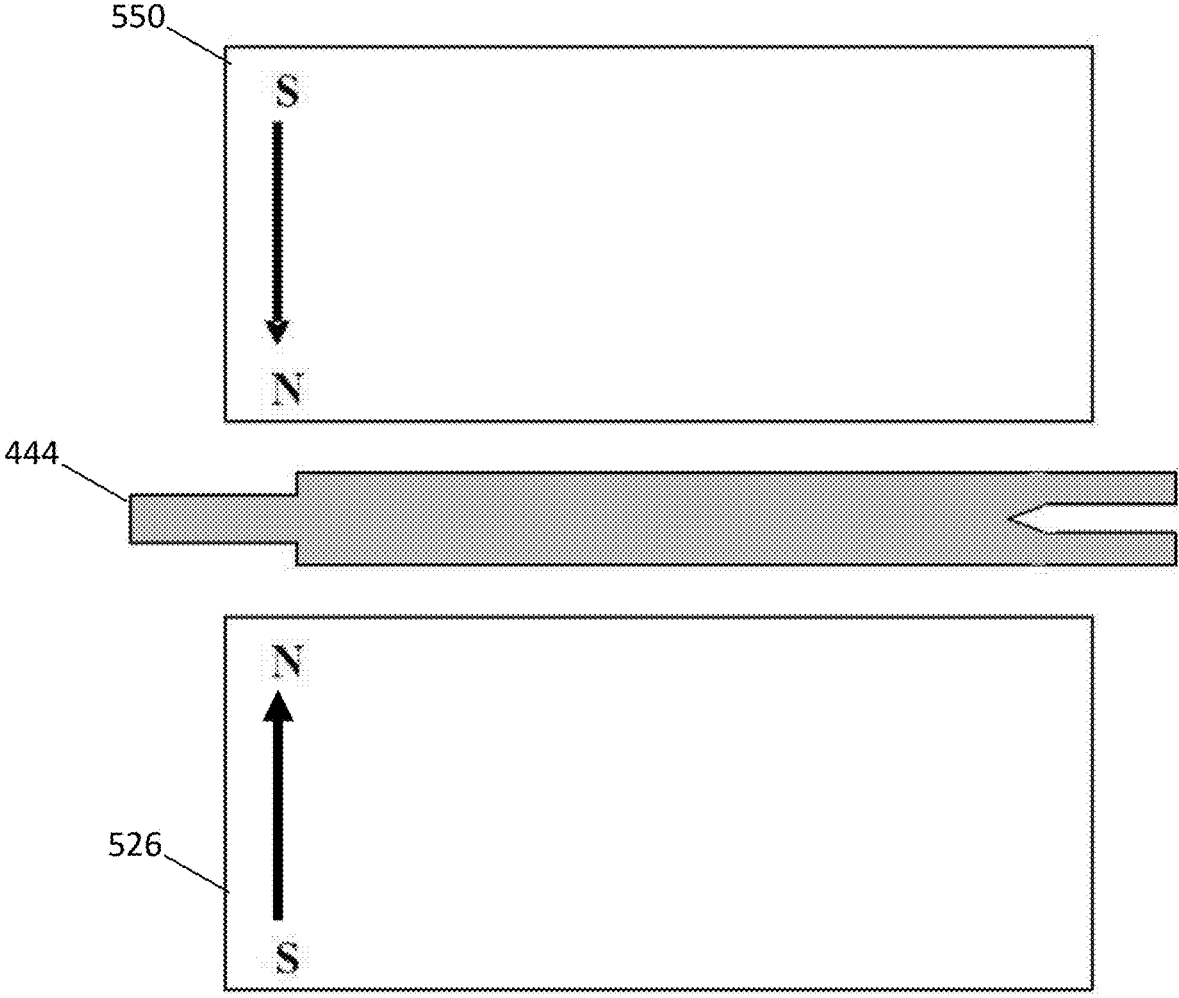

FIGS. 16 and 17 schematically show one example of an arrangement of magnets (e.g. upper and lower magnets 526, 550 of the core shown in FIGS. 10A-B) relative to a flow cell cartridge when the cartridge is clamped in the core. As shown, opposing poles of magnets may be positioned above and below the processing portions 444 of the cartridge's processing channels. Further as shown in FIG. 16, adjacent processing channels may include opposite polarity of magnets. In this example, alternating magnet polarities facilitate minimizing field cancellation between adjacent pairs of magnets. In other examples, magnets may be arranged in non-alternating configurations. In some applications, the magnets may be arranged to prioritize certain aspects of the magnetic separation process. For example, in one example, magnets may be arranged in an alternating configuration to optimize speed and dynamic range of the separation process. In another example, magnets may be arranged in a non-alternating configuration to optimize resolution of the separation process. As discussed below, separation systems may include several removable units, allowing a user to swap out one unit (having, for instance, a particular arrangement of magnets) with another unit (having, for instance, a different arrangement of magnets).

Figure 18A:
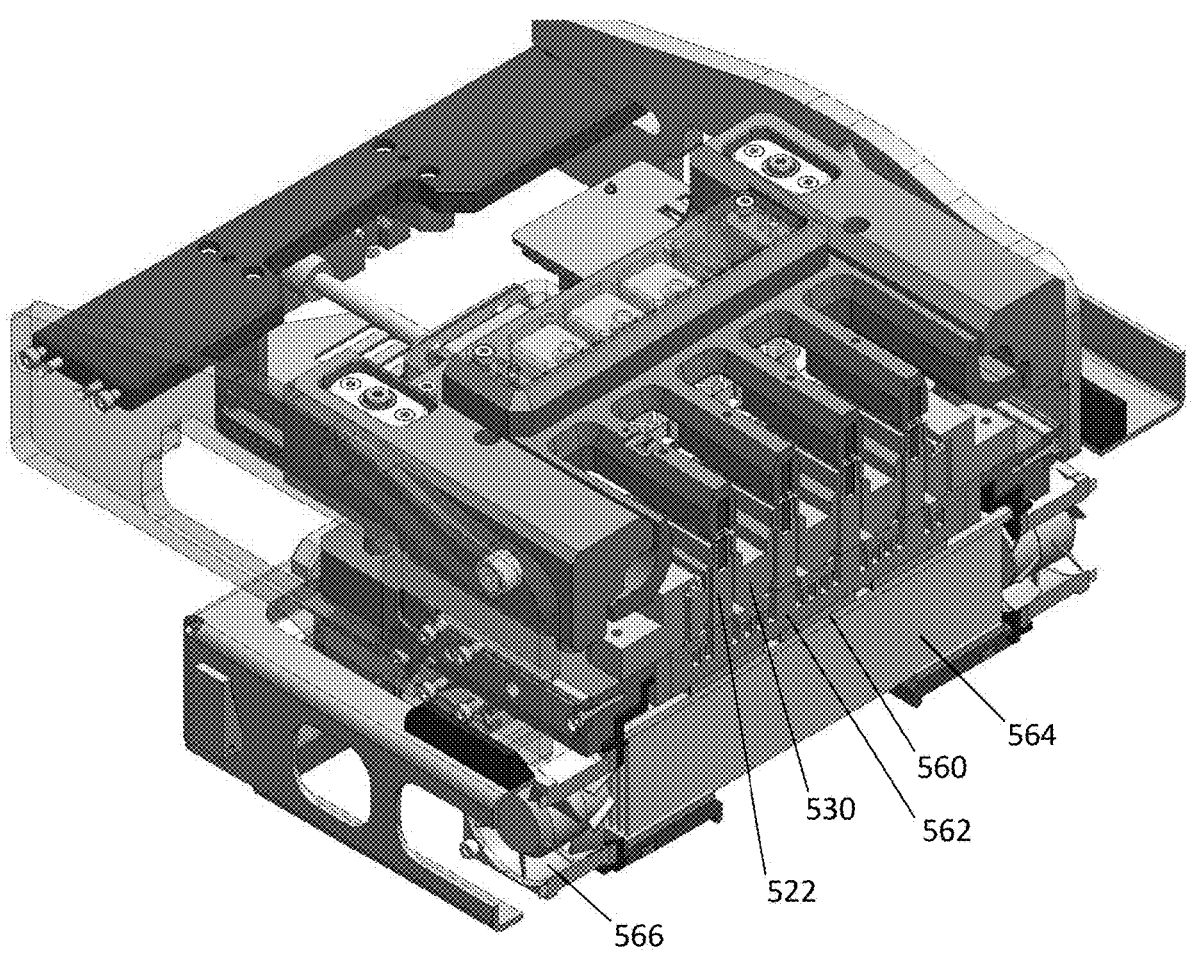
FIGS. 18 A-B and 19 show the core of FIGS. 10 A-B in cross-section.
Figure 18B:
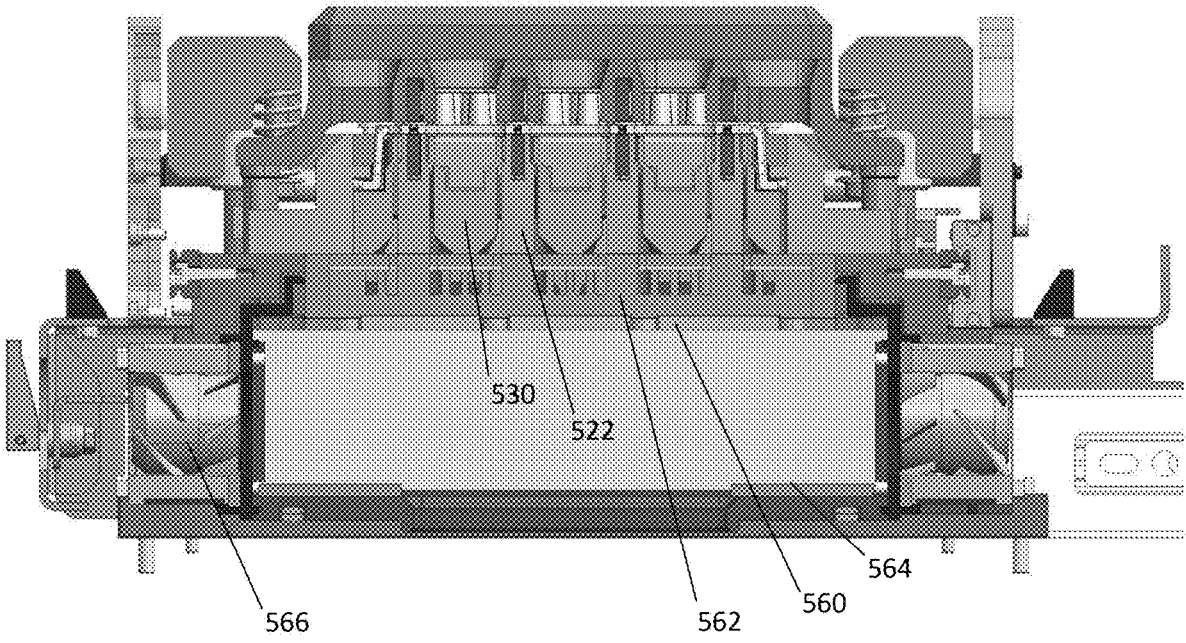

As mentioned above, the core may include components for regulating flow cell temperature. FIGS. 18A-B show cross-sections of the core of FIGS. 10A-B. In this example, a cooling assembly of the core includes a thermoelectric (Peltier) module(s) 560, a temperature controlled plate 562 positioned on the upper surface of the thermoelectric module 560, a heat sink 564 underneath the thermoelectric module 560, and fans 566. In this example, the earlier described pillar bodies 522 and lower clamp body 530 are also involved in regulating flow cell temperature.

Figure 19:
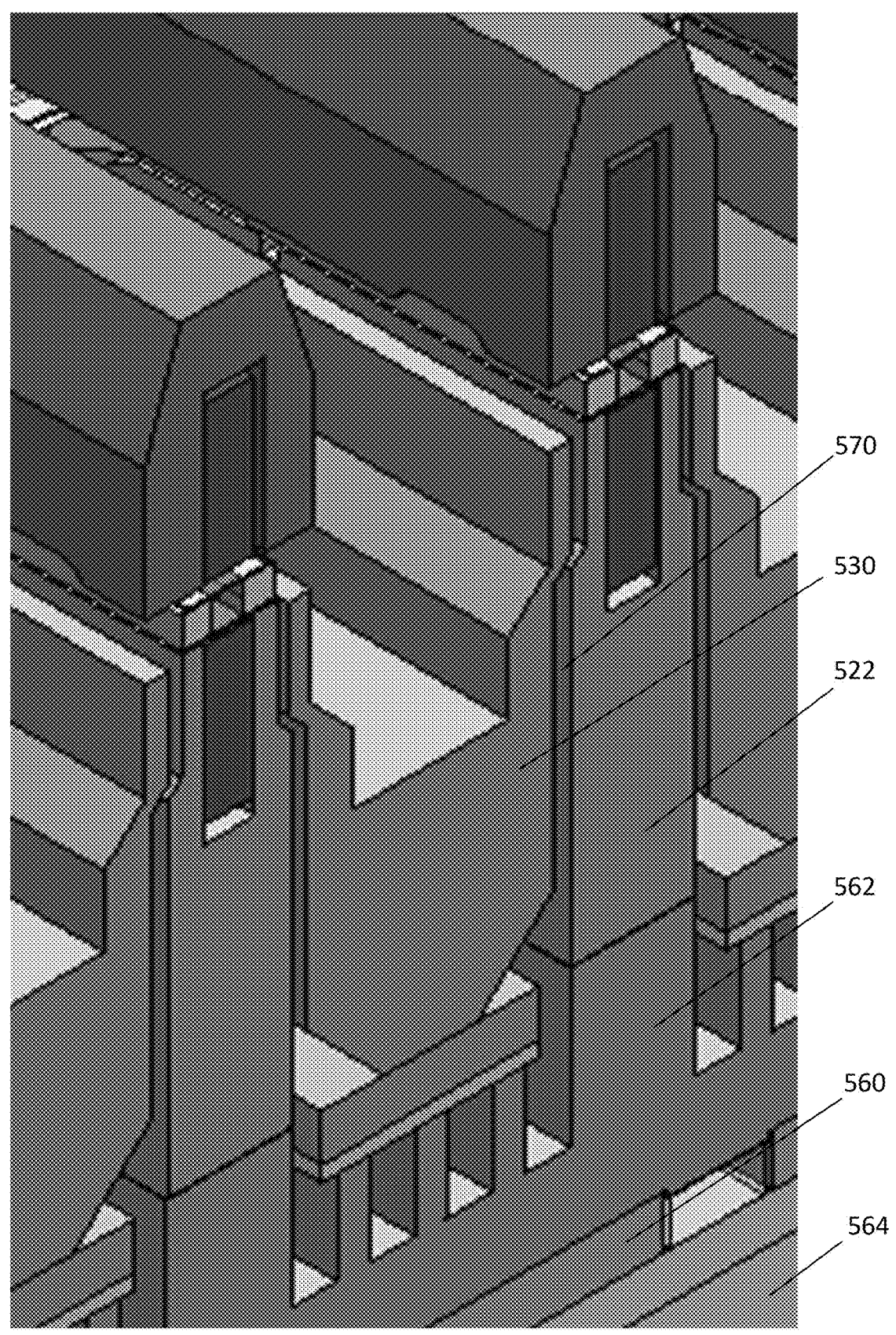

In the example of FIGS. 18A-B, applying current to the thermoelectric module 560 (which may be one or more individual modules) creates a temperature differential between two of its surfaces, cooling one of those surfaces (in this example, the upper surface of the module 560) and heating the other surface (in this example, the lower surface of the module 560). On the heated side of the module 560, heat generated by the heat sink 564, facilitated by fans 566. On the cooled side of the module 560, in the example shown in FIG. 18 (and in the magnified view in FIG. 19), bottom surfaces of the pillar bodies 522 are in direct contact with the temperature controlled plate 562, which is in turn in direct contact with the cooled side of the module 560, such that operation of the thermoelectric module 560 cools the temperature controlled plate 562 via conduction, which in turn cools via conduction the pillar bodies 522, which in turn cools via conduction the flow cell cartridge in direct contact with the upper surfaces of the pillar bodies 522. As can also be seen in FIGS. 18 and 19, cavities in the lower clamp body 530 define air channels 570, such that air cooled by the temperature control plate 562 flows along the side surfaces of pillar bodies 522, further cooling them via convection and up around the channel beams 432 of the flow cell cartridge, further cooling the cartridge via convection. While not shown in complete detail in the figures, additional fan units (separate from the fans used to cool the heat sink) may move air through channels in the temperature control plate 562, with that cooled air moving up through the air channels 570 around the pillar bodies 522. In short, the core in this example is configured to cool the flow cell cartridge through both conductive and convective heat transfer. Thermistors or other feedback mechanisms (not specifically referenced in the figures) can be used to sense temperature and regulate the operation of module 560 or other cooling module, thereby regulating the temperature of the flow cell cartridge to a desired level or range. The same thermoelectric modules and associated components may instead be used to warm the cartridge above ambient temperature. The same thermoelectric modules and associated components may instead be used to maintain a fixed temperature at or near ambient temperature, to reduce fluctuations. In other words, the temperature regulation components of a particle separation system may be configured to cool, warm, or alternatively cool and warm a flow cell cartridge.

In some implementations, the particle separation system may be configured to allow an end-user or technician to relatively easily remove the core as a single unit and replace it with another core. For example, with reference to FIGS. 10, 11, and 18, the removable unit may include the upper clamp 502, lower clamp 504, clamp plates 506, linear actuator 518, temperature control plate and thermoelectric module 508, heat sink 564, and fans 566, all of which may be interconnected together such that they can be removed from and installed into the particle separation system as a single unit. In some instances, a removable/replaceable core unit may allow for reconfiguration of the particle separation system, such as by changing the number, type (e.g. field strength), and arrangement of magnets in the clamping blocks, changing the number of particle separation channels that the system can simultaneously process, changing aspects of the temperature control system, etc.

Figure 20:
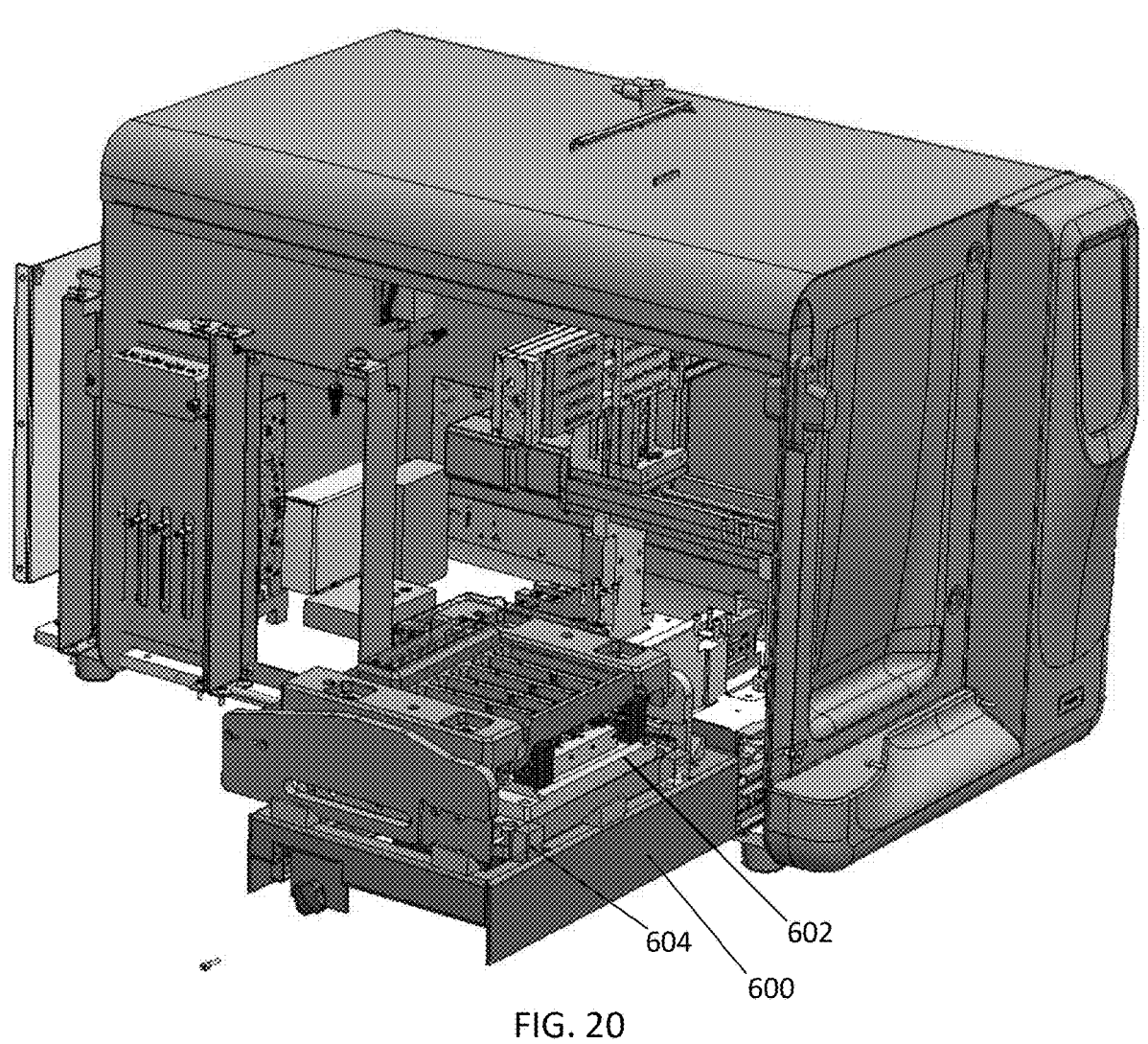
FIGS. 20-22 illustrate an example of a removable core of a particle separation system.
Figure 21:
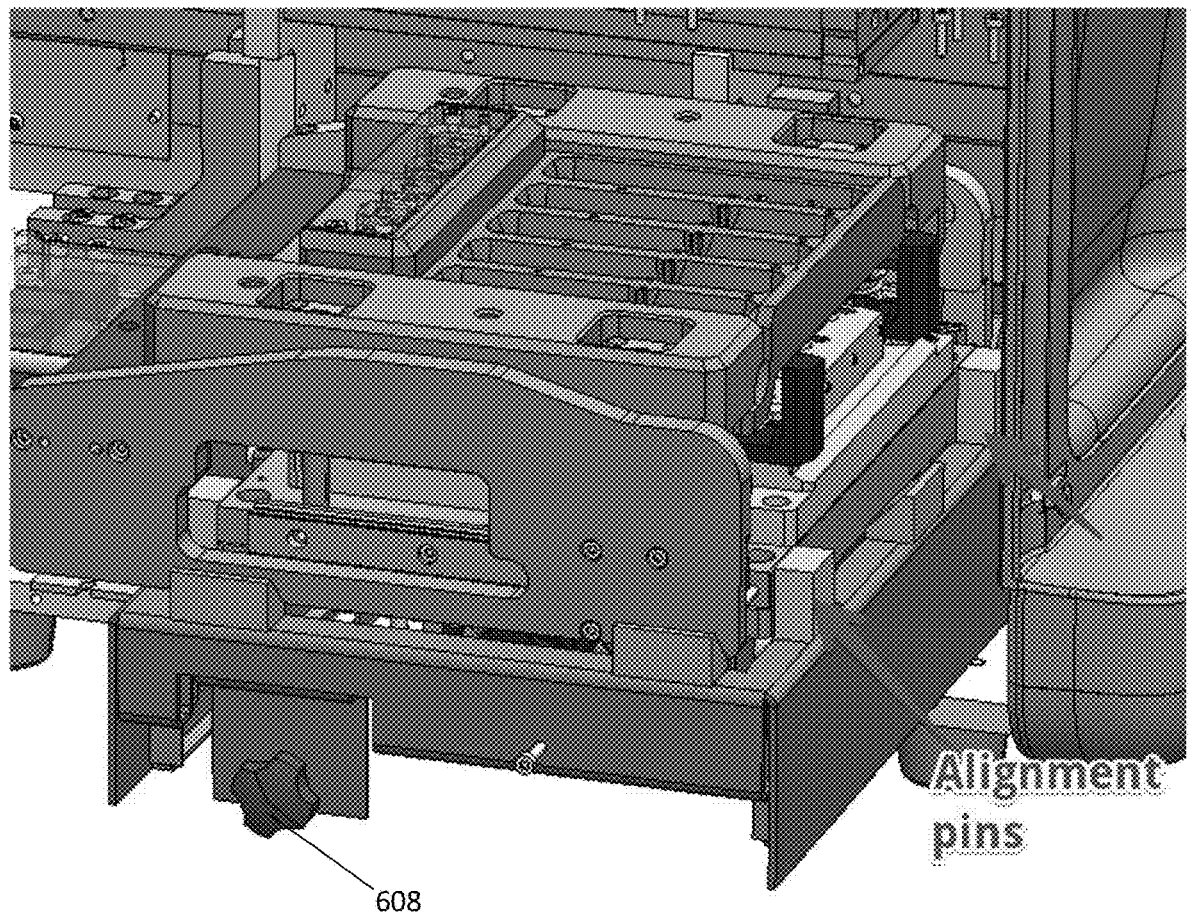
Figure 22:
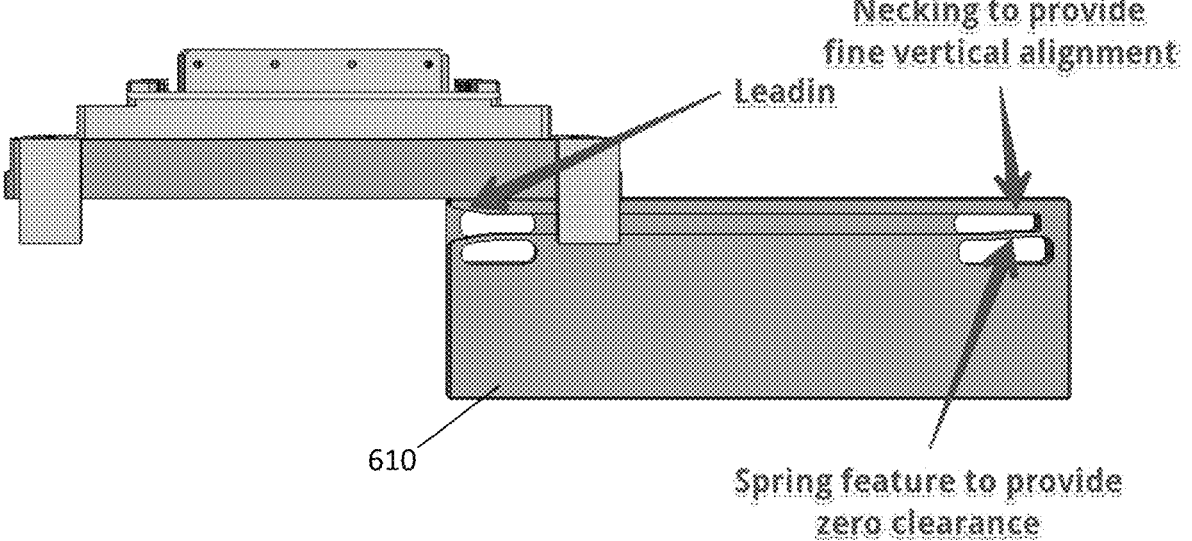

FIGS. 20-22 illustrate one example of a particle separation system including a removable/replaceable core. As shown in FIG. 20, the particle separation system includes a tray 600 that, after removal of a portion of the system's cover, can be slid in and out to access the removable core 602. Alignment pins 604 on the removable core 602 may fit into slots on the tray 600 to facilitate proper alignment and seating of the removable core 602 in the tray 600. FIG. 21 shows in more detail alignment pins of the removable core seated in slots. FIG. 21 also shows a hand screw 608 of the tray 600 for securing the tray 600 in the system after being slid in.

FIG. 22 schematically illustrates one of the two runners 610 that the tray (not shown) is mounted on in a sliding fashion to allow the tray to be slid in and out. As shown in FIG. 22, the runner 610 includes a guide that is wider at one end to facilitate insertion of the tray into the runners. As also shown in FIG. 22, the guide narrows or necks at its opposite end to provide precise vertical alignment of the removable core when fully slid in. A spring feature at the end of the guide biases the tray and removable core upward, so that there is little to no vertical clearance between the top of the guide and the parts of the tray that interact with the guide when the tray is fully slid in.

In one example method, a removable core unit can be removed and replaced with another core unit by first removing all or a portion of the housing of the particle separation system. Next, a tray holding the core unit may be slid out of the housing, and fluidic, electrical and other connections between the core unit and the rest of the system may be disconnected. Next, the removable core unit (including upper and lower clamps, clamp plates, linear actuator, temperature control plate and thermoelectric module, heat sink, and fans) may be lifted out and removed from the system as a single unit. Next, another core unit (having the same or different configuration as the removed core unit)

may be lowered as a single unit into the tray, with alignment pins on the removable core fitting into slots in the tray and providing for proper alignment and seating of the core unit in the tray. Next, the tray holding the new core unit may be slid back into the system, and fluidic, electrical, and other connections between the core and the rest of the system being connected. Lastly, a hand screw is tightened to secure the tray in the system, and the housing is replaced. The hand screw may be replaced by clamps including but not limited to over center clamps or quarter-turn clamps, or fasteners requiring a tool such as a hex key.

Imaging

The particle separation system 200 shown in FIG. 2 includes an imaging sub-system 208 for imaging the processing channels of the flow cell cartridge 202 and/or the particles in those processing channels, including before, during, and/or after particle separation by magnetic levitation.

The imaging sub-system may be constructed to provide microscopic imaging of the processing channels of the flow cell cartridge. Optionally, the imaging sub-system may be constructed and arranged to provide imaging for florescence emission with optional ultraviolet light exciter modules. The imaging sub-system may include a source of visible optical illumination constructed and arranged to provide light transmission through the processing channel of the flow cell. The imaging system may employ optics to allow bright-field illumination, dark-field illumination, and/or fluorescent detection of sample components. For imaging of fluorescent entities in the processing channel, the imaging sub-system may optionally include a dual band-pass filter preferably passing emitted radiation in bands centered at wavelengths at about 524 nm and 628 nm.

For the multi-channel flow cell cartridge 400 depicted in FIGS. 4-8, imaging may occur through side surfaces 456, 458 of channel beams 432 (see, for example, FIG. 7). As shown in FIG. 4A, openings 474 in the flow cell cartridge 400 (including openings extending through the top and bottom surfaces of the cartridge and/or through the sidewalls of the cartridge) expose the channel side surfaces 456, 458 of the channel beams 432. The openings (which are generally rectangular in this example) allow for optical access to the side surfaces 456, 458 so that the contents of the processing portion of the processing channels 444 may be imaged. The imaging sub-system may include any device which enables or enhances the ability to view in real time and/or to record particles as they pass through processing channel, thereby enabling observation and/or measurement of the isolation of the particles, including the extent of particle separation and/or the rate of particle separation. Visualization may also include analysis of the collected images.

Figure 23:
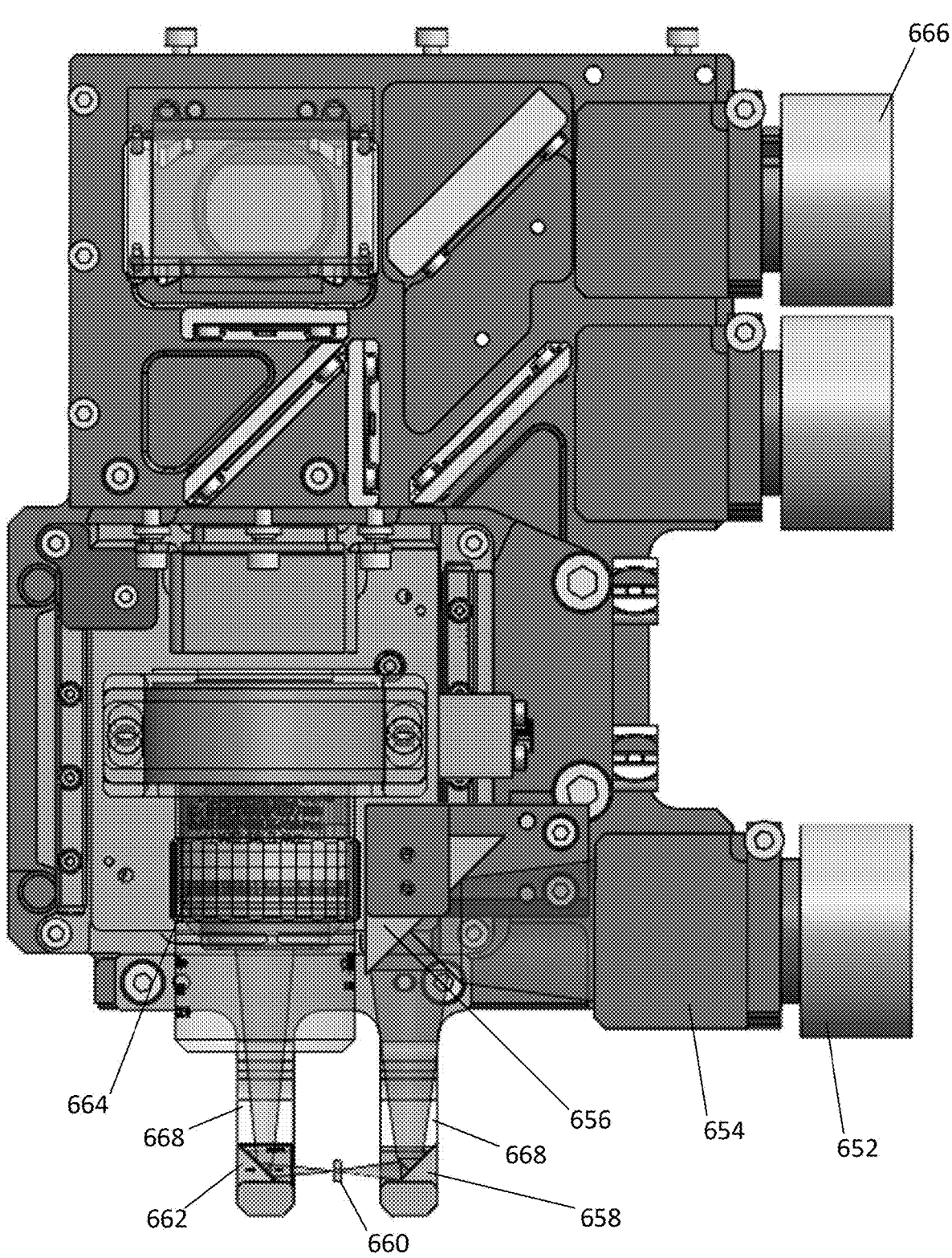
FIGS. 23 and 24 illustrate an example of an imaging sub-system of a particle separation system.
Figure 24:
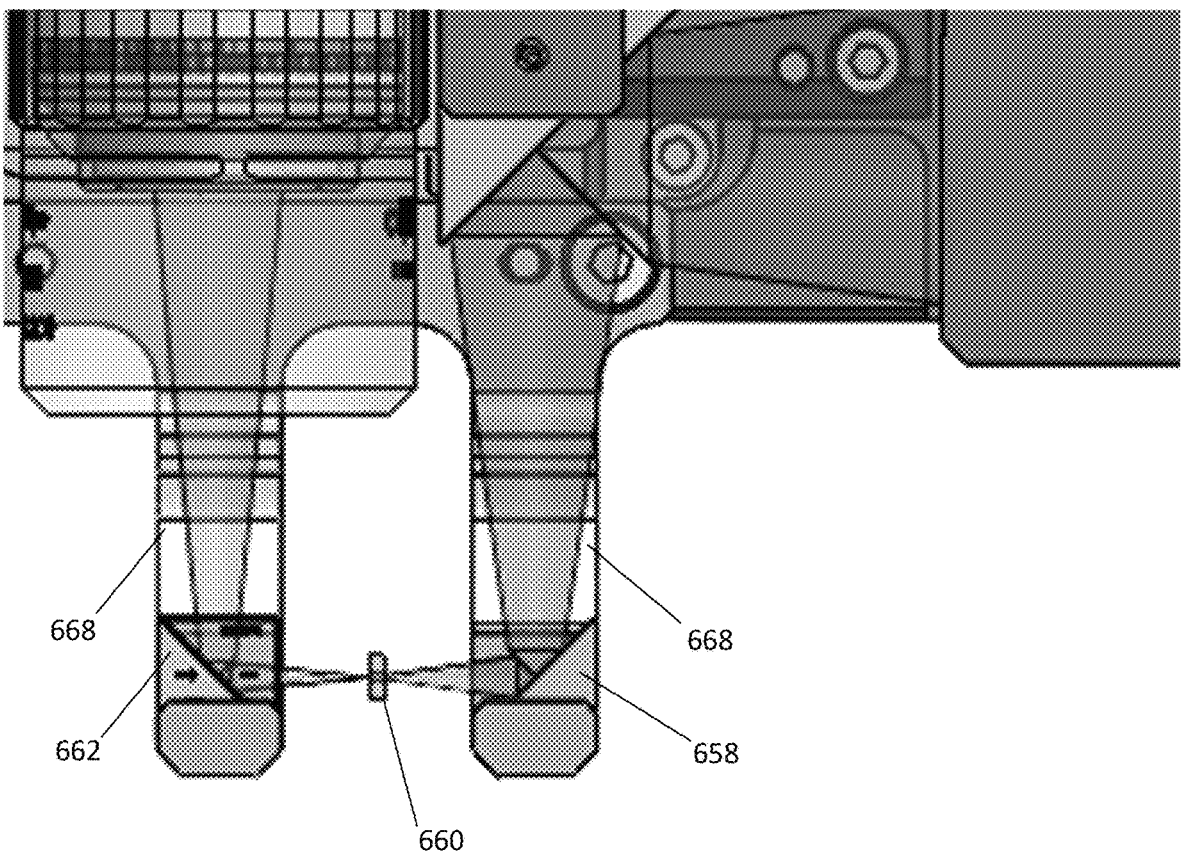
Figure 25:
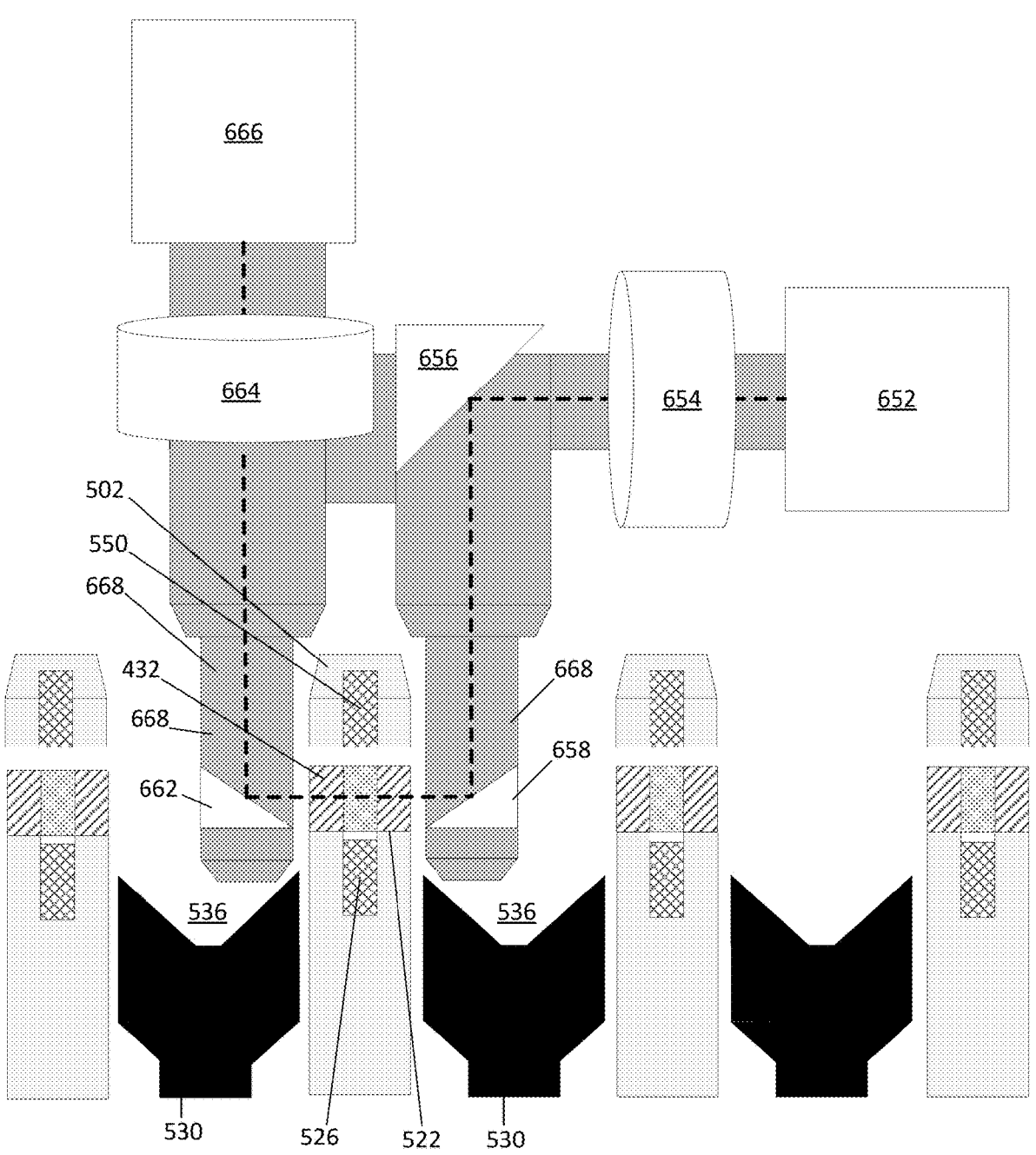
FIG. 25 illustrates another example of an imaging sub-system of a particle separation system.
Figure 26:
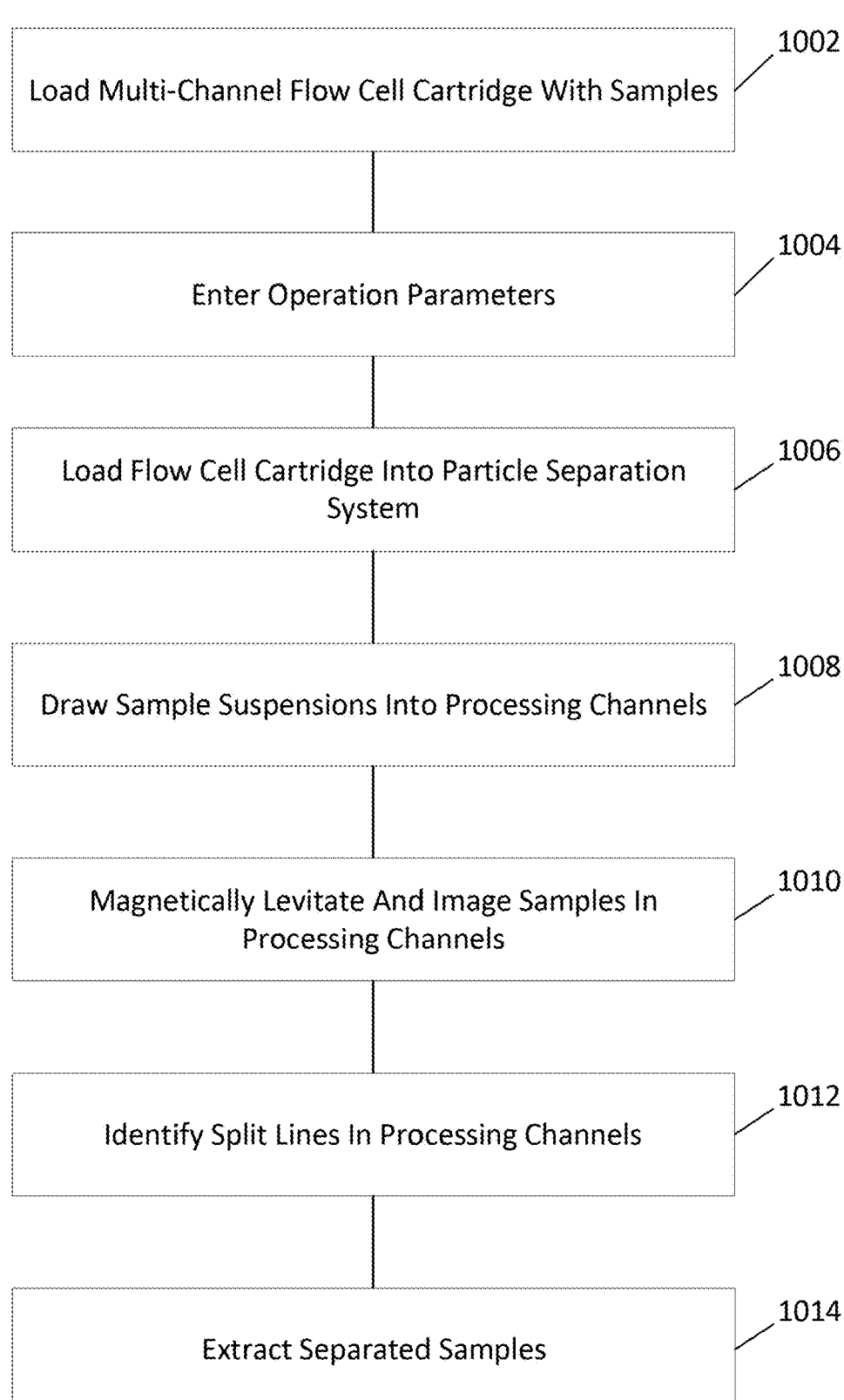
FIG. 26 illustrates an example of a method of operation for a particle separation system.

FIGS. 23 and 24 illustrate an example of an imaging sub-system useable in a particle separation system. In this example, the imaging sub-system includes an illumination source 652, focusing optics 654, and reflector optics 656 and 658, configured to illuminate particles in a processing channel (schematically indicated at 660). As shown in FIGS. 25 and 26, the imaging sub-system also includes reflector optics 662, objective 664, and one or more sensors 666 configured to image the illuminated particles in processing channel 660. The imaging sub-system can be configured for use with a wide variety of sensors, such as CCD, CMOS, or other sensors. While not specifically referenced in FIGS. 25 and 26, the imaging sub-system can include one or more fine translation stages for adjusting focus of the system optics. While also not specifically referenced in FIGS. 25 and 26, the imaging sub-system can include one or more adjustable apertures or other components for adjusting or changing the depth-of-field at which processing channel 660 is imaged.

The imaging sub-system or at least components of it may be mounted on a multi-degree of freedom device for positioning the imaging sub-system for imaging the processing channels of the multi-channel flow cell cartridge. In one example, the imaging sub-system is mounted on a multi-stage translation device configured to move the imaging sub-system along x, y, and z axes.

As shown in FIGS. 23 and 24, reflector optics 658 and 662 are mounted on distal ends of periscope arms 668. Periscope arms are configured to allow reflector optics 658 and 662 to be lowered through openings 546 in the upper clamp body and into openings 474 in the flow cell cartridge 400 and slots 536 in the lower clamp body 530, so that reflector optics 658 and 662 can be positioned adjacent the sides 456, 458 of a channel beam 432 of the multi-channel flow cell cartridge 400 while most of the components of the imaging sub-system remain positioned above the multi-channel flow cell cartridge 400.

FIG. 25 shows in cross-section a schematic example of how components of an imaging sub-system may be positioned relative to parts of an upper clamp, flow cell cartridge, and lower clamp during imaging. As shown in FIG. 25, periscope arms 668 extend down through openings between portions of the upper clamp 502, between the channel beams 432 of the flow cell cartridge, and into slots 536 formed in the lower clamp body 530. In this fashion, both side surfaces of each of the channel beams 432 can be imaged through even though the channel beams 432 are arranged in a planar array of several parallel channels, and even though the top surfaces of the channel beams are obstructed by magnets 550 and other portions of upper clamp body, and bottom surfaces of the channel beams 432 are covered by the top surfaces of pillar bodies 522 and magnets 526 of the lower clamp. In other words, the imaging sub-system is configured to image particle separation in each of the processing channels while still allowing for positioning of magnets above and below those channels and positioning of the pillar bodies 522 and other parts of lower clamp 504 that facilitate cooling of the flow cell cartridge via conductive and convective heat transfer, as discussed in an earlier section of this document.

In the example illustrated in FIG. 25, the imaging sub-system is configured to image particle separation in the processing channels via a folded optical path, in which most of the components and structure for the imaging sub-system is located above the various components of the core unit. In this particular example, the optical path begins at illumination source 652 and focusing optic 654, turns ninety degrees at reflector optic 656 and travels downwardly through an opening in the upper clamp body, turns ninety degrees at reflector optic 658 mounted on distal end of periscope arm 668, travels through the processing channel of channel beam 432 (below the magnet 550 and other portions of upper clamp and above the magnet 526, pillar body 522, and other portions of lower clamp body 530), turns ninety degrees at reflector optic 662 and travels upwardly through another opening in upper clamp body, and subsequently travels to objective 664 and sensor 666.

As noted earlier, the imaging sub-system may be mounted on a multi-axis translation device for positioning and moving the imaging sub-system along x, y, and z axes. In some implementations, this facilitates scanning the periscope arms and rest of the imaging sub-system along a length of each channel beam. In an example mode of operation, the multi-axis translation device may position the imaging sub-system with its periscope arms straddling one of the channel beams of the flow cell, and then scan along the length of that processing channel to image all or at least a substantial length of the processing channel in that channel beam. Next, the translation device may withdraw the periscope arms from around the first channel beam and move to the adjacent channel beam and scan to image that processing channel along its length. The process may be repeated until all of the channel beams have been scanned along lengths of the processing channels, and may be repeated continuously or periodically during operation of the particle separation system.

In the particular example shown, the imaging sub-system utilizes a periscope with distally mounted reflectors for optically accessing the imaging surfaces of the multi-channel flow cell. In other examples, the flow cell itself may have incorporated reflectors on one or both sides of the reflectors to facilitate imaging, or the system and/or flow cell may be otherwise configured to render a periscope unnecessary for optical access.

Example Method of Operation

FIG. 26 illustrates one example of a method of operating a particle separation system.

At step 1002, a multi-channel flow cell cartridge is selected and one or more inlet wells of the cartridge are loaded with the samples for analysis suspended in a paramagnetic fluid medium. The operator may enter identifying information about the cartridge into the system, such as by scanning a unique barcode affixed to the cartridge.

At step 1004, the operator enters operation parameters for the particle separation system. Operation parameters may include the types of particles for analysis (e.g. size(s) or types(s) of cells, cell components (e.g. nuclei), or other particles for analysis), the presence or absence of and/or type of debris in the fluid sample, the concentration of levitation agent, which fraction is most desired for recovery, and the temperature at which the process will be run. Different operation parameters may result in different run (levitation) times and/or pump parameters, may result in capturing target particles from one fraction (e.g. a bottom fraction) instead of another fraction (e.g. a top fraction), or other changes to operation of components of the system. Operation parameters may also include selecting an image analysis mode (e.g. continuous scanning vs. a single scan of each processing channel), selecting which channels of the flow cell cartridge will be run, and (for networked systems) which particular device will be used. In some implementations, the particle separation system may be configured to receive and apply different run parameters to different channels of the flow cell cartridge. The operator may enter parameters using a user interface on the device itself, or, for networked systems, at a central computer.

At step 1006, the flow cell cartridge is loaded into the particle separation system. The operator positions the flow cell cartridge between the upper and lower clamps of the devices core, and the flow cell cartridge is clamped in place. Clamping the flow cell cartridge fluidically connects the collection well outlets of the cartridge to the syringe pumps of the pumping sub-system.

At step 1008, the syringe pumps apply negative pressure to the cartridge's fluidic channels via the collection well outlets, drawing the sample suspensions from the inlet wells into the processing portion of the cartridge's fluidic channels.

Figure 27:
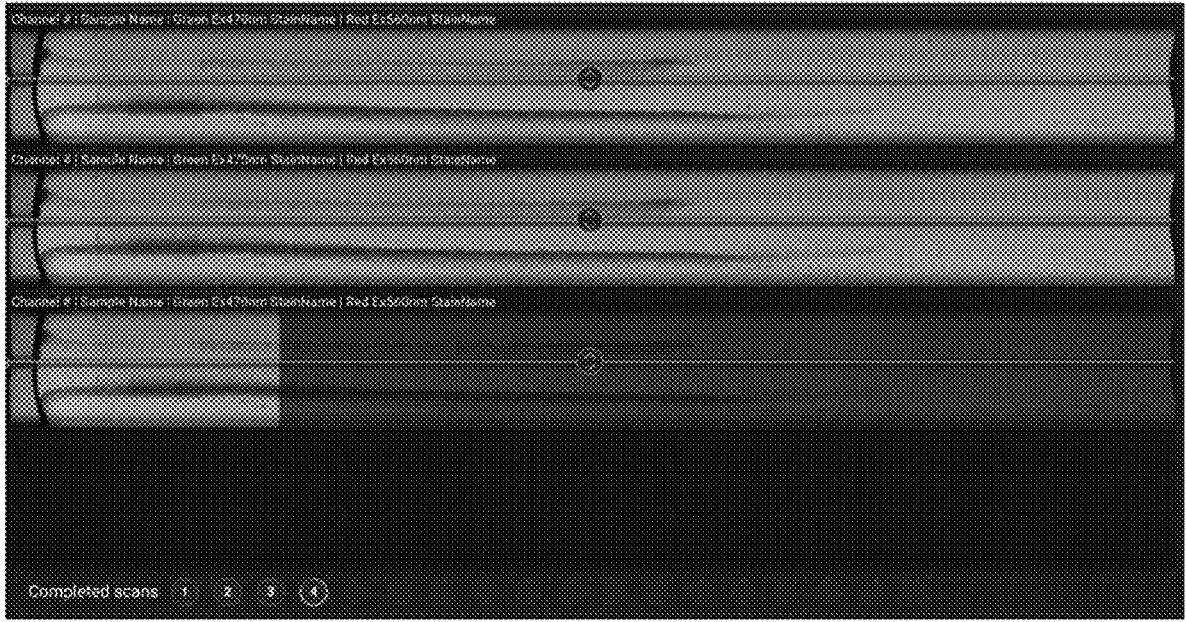
FIG. 27 shows an example of a display of a particle separation system, showing imaging obtained from three particle separation channels.

At step 1010, particles are separated in the processing channel by magnetic levitation. Some or all of the separation may take place over a dwell time in the processing channels, in which the pumping sub-system does not induce fluid flow in the processing channels. Before, during, and/or after particle separation, the system may image the processing channels, allowing visualization of the separation and other analysis of the particles in the processing channels. FIG. 27 shows an example of images of three processing channels of a cartridge, along lengths of those channels. The images show that the particles in each processing channel have been magnetically levitated and separated into two distinct bands of particles in each channel.

At step 1012, the operator may identify and enter a split line position into the system, delineating a vertical dividing line in each processing channel, below which one of the bands of particles has generally collected and above which the other band of particles has generally collected. FIG. 27 shows an example of a split line identified for each channel, along with a graphical button for adjusting each split line up or down in the processing channel.

At step 1014, the pumping sub-system is operated to extract the separated bands of particles into separate collection wells. In some implementations, the system may use data associated with the indicated split line position to adjust the operation of the pumping sub-system during fluid extraction. For example, if the split line of a particular channel is set relatively high or low in the processing channel, the system may adjust operation of the two syringe pumps associated with that processing channel so that one of the syringe pumps applies a higher negative pressure to the particular collection well outlet it is connected to than the other syringe pump connected to the other collection well outlet associated with that processing channel. Such an adjustment may result in changing the vertical level or dividing line at which the separated particles are collected in the two different outlet channels flowing from that processing channel during extraction.

Figure 28:
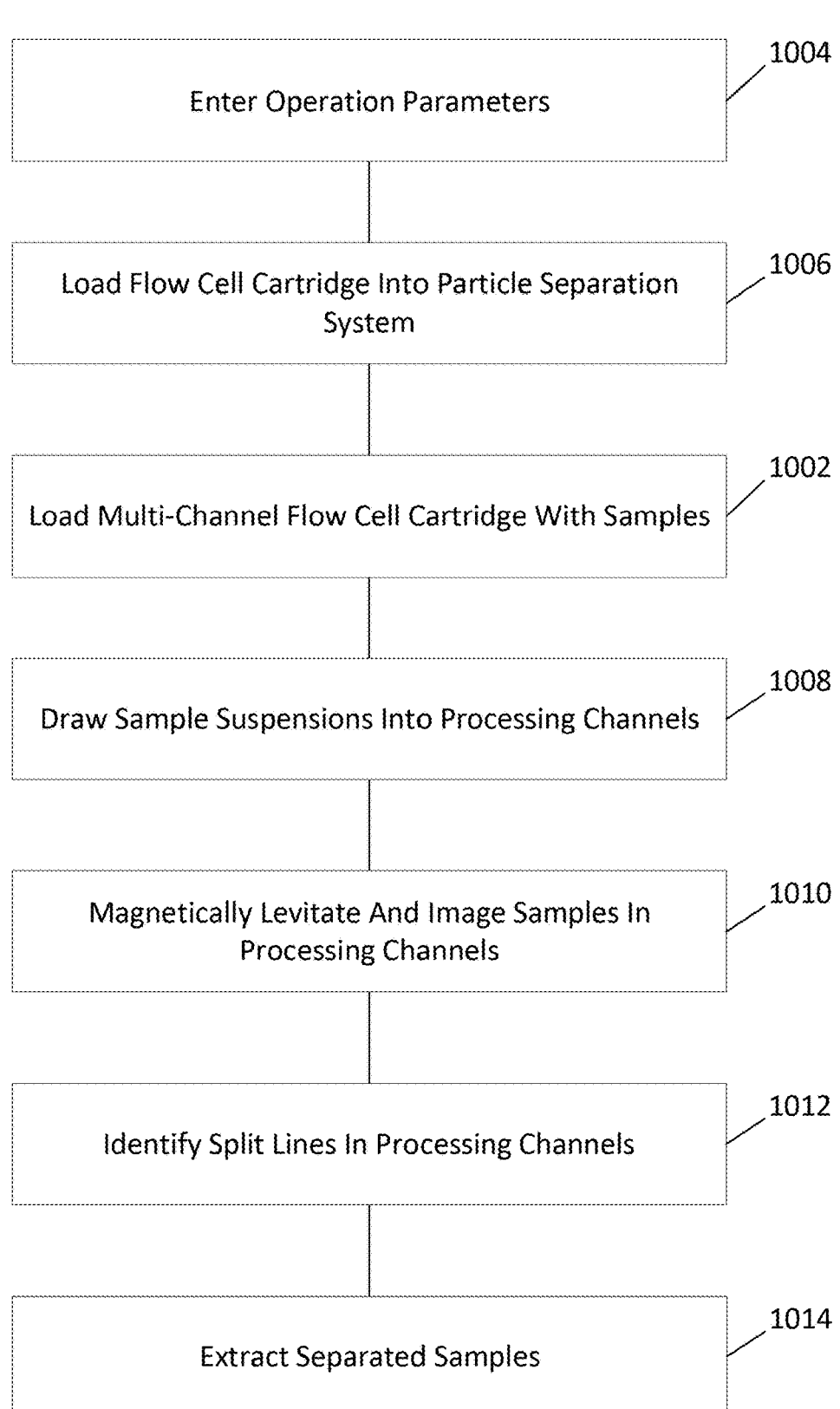
FIG. 28 illustrates an example of a method of operation for a particle separation system, in a different order of operation than illustrated in FIG. 26.
Figure 29:
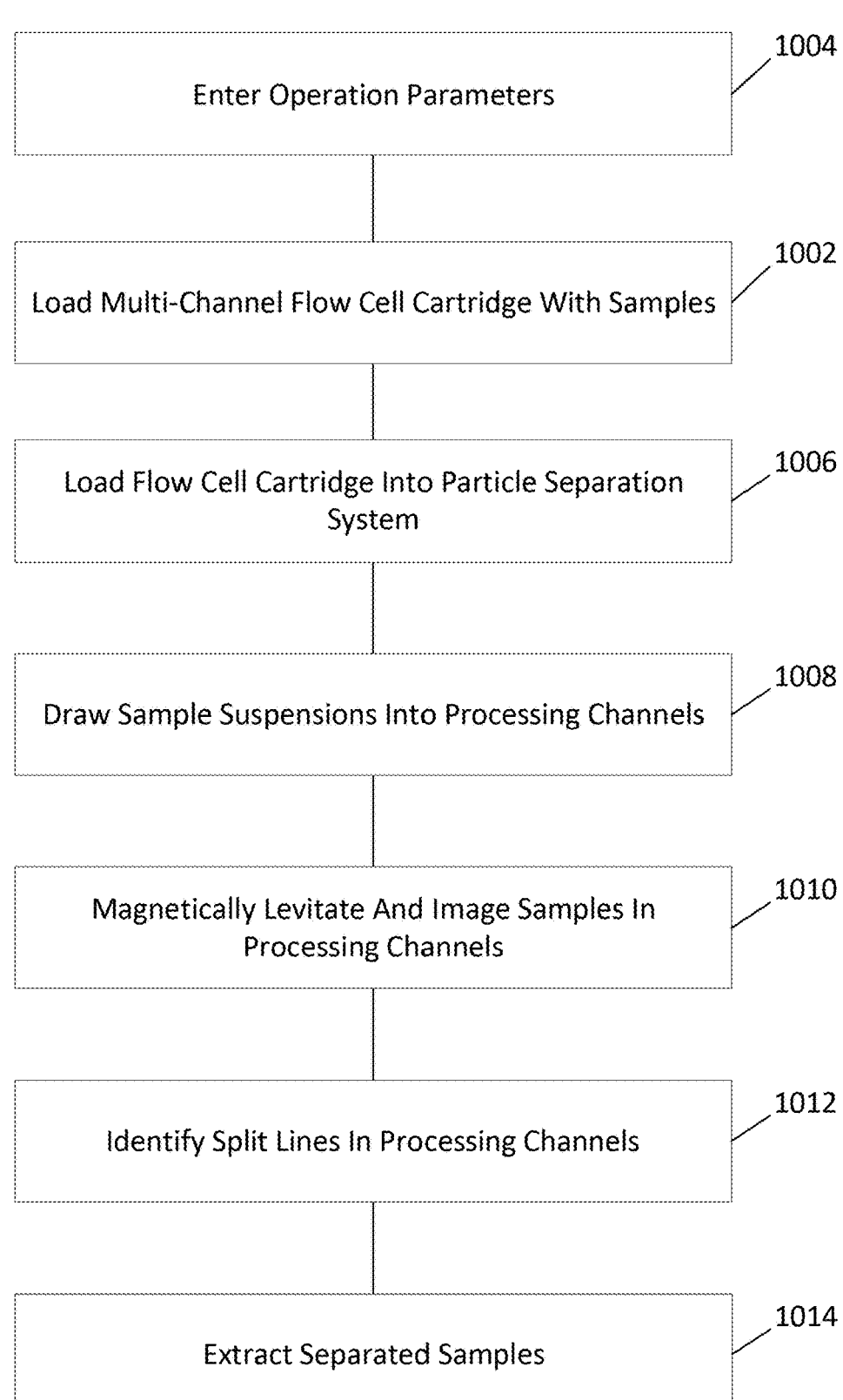
FIG. 29 illustrates an example of a method of operation for a particle separation system, in a different order of operation than illustrated in FIGS. 26 and 28.

The above-described systems and methods are not limited to the specific order of operation illustrated in FIG. 26. FIGS. 28 and 29 illustrate additional examples of orders of operation that could be employed.

The above-described systems and methods may allow for separation of sample(s) having relatively large numbers of cells or other particles. For example, the above described systems and methods may be capable of handling samples having in total 100 million particles for separation (e.g. particles having an average size of 3 microns) or more in a single processing run. As another example, the above described systems and methods may be capable of handling 20 million particles for separation (e.g. particles having an average size of 5 microns) or more per processing channel in a single processing run. Separations of large numbers of cells or particles are rapidly accomplished without subjecting the particles to the stresses associated with other separation techniques such as FACS or centrifugation. Rapid separation of large numbers of particles is performed by a method comprising; loading a sample comprising particles and a sample medium comprising a paramagnetic compound or ferrofluid into a plurality of separation channels, subjecting the sample to a magnetic force with at least one magnet to affect a separation, optionally collecting at least two fractions of the separated sample, and optionally imaging the particles in the sample prior to, during, and/or after the separation. In this method, the sample can comprise from about 1,000,000 to about 100,000,000 particles. The total time for separation can range from about 1 minute to about 20 minutes. In the rapid separation method, the concentration of such particles of interest is increased in the solution or within a portion of the solution by a ratio of at least about 100:1, 90:1, 80:1, 70:1, 60:1, 50:1, 40:1, 30:1, 20:1, 10:1, 5:1, 3:1, 2:1, 1.5:1, or 1.1:1. Particles and/or cells of interest within a solution containing multiple types of particles may be deemed "separated" if, after processing the solution, the ratio of the concentration of the particles of interest to the concentration of other types of particles is increased, or if the ratio of the concentration of the particles of interest to the concentration of other types particles is increased by at least about 10%, 50%, 100%, 200%, 300%, 400%, 500%, 600%, 700%, 800%, 900%, or 1000%, or if the concentration of other particles of the solution (including, but not limited to, the types of particles other than the particles of interest) is decreased by less than about 20%, 15%, 10%, 8%, 6%, 5%, 4%, 3%, 2%, 1%, or 0.5%. In a preferred embodiment of the rapid separation method, the viability of separated cells or organisms in the enriched collected portion of the sample is at least 70% of the viability of the cells or organism in the starting sample pre separation. Preferably the viability of separated cells or organisms in the enriched collected portion of the sample is at least 75%, 80%, 85%, 90%, 95%, 97%, or 99% of the viability of the cells or organism in the starting sample pre separation. The starting sample may comprise from about 1,000,000 to about 100,000,000 particles, from about 5,000,000 to about 100,000,000, from about 10,000,000, to 100,000,000, from about 20,000,000 to about 100,000,000, from about 30,000,000 to about 100,000,000, from about 40,000,000 to about 100,000,000, from about 50,000,000 to about 100,000,000, from about 60,000,000 to about 100,000,000, from about 70,000,000 to about 100,000,000, from about 80,000,000 to about 100,000,000 or from about 90,000,000 to about 100,000,000 particles. The time to separate and collect fractions of the separated particles can be 20 minutes or less, 18 minutes or less, 15 minutes or less, 12 minutes or less, 10 minutes or less, 8 minutes or less, 5 minutes or less, 3 minutes or less, or less than 1 minute. Particle sizes can range from a dimension, such as a diameter, of from about 100 nm to 100 µm or larger. For prokaryotic cells, a typical lower limit might be about 400 nm whereas eukaryotic cells may range from about 10 µm to about 100 µm with human female egg cells being on the largest end of the range. Other particles or organisms may be larger. In an embodiment of the rapid and high capacity separation method described above, the particles separated are cells. The cell types separated by the above method can include human cells, non-human animal cells, plant cells, eukaryotic cells (for example, but not limited to, immune cells, endothelial cells, yeasts and T-cells), prokaryotic cells, including bacteria, etc. cells, organisms, organelles, nuclei, organic material such as organic polymers and proteins, particulates of organic or inorganic compounds as well as particles such as beads, bubbles, and fragments. Multiple cell types may include dead cells, alive cells, healthy cells, pathological cells, infected cells, transfected cells, or genetically modified cells. Cells separated according to the methods of this disclosure can be directly obtained from an organism (or be an organism itself), or propagated or cultured. In a particular embodiment of the rapid, high capacity separation method, live cells are separated from dead cells. In another embodiment of the separation method, viable transfected cells and/or crispr modified or otherwise gene-edited cells are separated from dead transfected cells and/or crispr-modified or otherwise gene-edited cells and/or non-transfected cells and/or non-crispr-modified or otherwise non-gene edited cells. In another embodiment of the method, healthy cells are separated from diseased cells. In a further embodiment of the method, cellular nuclei are separated from cells, cell fragments, and/or sample debris. In various embodiments, these methods are performed utilizing the cartridges and systems described herein.

It is understood that the examples and embodiments described in the present disclosure are for illustrative purposes only and that various modifications or changes in light thereof will be suggested to persons skilled in the art and are to be included within the spirit and purview of this application and scope of the appended claims. All publications, patents, and patent applications cited in the present disclosure are hereby incorporated by reference in their entirety for all purposes.

What is claimed is:

1. A multi-channel flow cell device, comprising:
   (a) a substrate;
   (b) a plurality of fluidic separation channels formed in the substrate, in which:
      (i) each fluidic channel comprises a magnetic processing channel in fluidic communication with an inlet and at least two outputs,
      (ii) each magnetic processing channel comprises at least one divider vertically separating a portion of the magnetic processing channel into at least an upper part and a lower part, the upper part in fluidic communication with one of the outputs and the lower part in fluidic communication with another of the at least two outputs,
      (iii) each magnetic processing channel further comprises at least one imaging surface extending along a length of the magnetic processing channel, the imaging surface configured to allow imaging of particles in the magnetic processing channel; and
   a plurality of openings extending through the substrate, wherein each opening extends between two adjacent magnetic processing channels, the openings configured for optical access to the at least one imaging surface of each magnetic processing channel;
   wherein the substrate and the plurality of fluidic separation channels formed in the substrate are configured as a multi-channel flow cell cartridge.

2. The multi-channel flow cell device of claim 1, wherein each magnetic processing channel comprises two opposing imaging surfaces extending along the magnetic processing channel.

3. The multi-channel flow cell device of claim 2, further comprising a plurality of channel beams formed in the substrate, the channel beams extending between an inlet end and an outlet end of the flow cell cartridge, the channel beams each comprising one magnetic processing channel, wherein each channel beam is spaced apart from adjacent channel beams.

4. The multi-channel flow cell device of claim 2, wherein the substrate further comprises side walls extending away from the fluidic channels, the side walls each comprising a sidewall opening configured for optical access to one of the imaging surfaces.

5. The multi-channel flow cell device of claim 2, further comprising a magnetic apparatus for processing particles comprising:
   (a) a holder configured to receive and hold the flow cell cartridge;

(b) an array of magnets, the array of magnets configured to apply magnetic field gradients to each magnetic processing channel when the flow cell cartridge is received and held by the holder, the array of magnets positioned at least one of above and below each magnetic processing channel when the flow cell cartridge is received and held by the holder; and
   (c) an imager configured to image vertical separation of particles in the magnetic processing channels while the flow cell cartridge is received and held by the holder and while the array of magnets is positioned at least one of above and below the magnetic processing channels.

6. The multi-channel flow cell device of claim 5, wherein the imager is configured to image particles in each magnetic processing channel via a folded optical path comprising:
   (i) a path portion that extends between a magnet positioned directly above and a magnet positioned directly below one magnetic processing channel, and
   (ii) a second a second portion that extends through an opening in the holder between two adjacent magnets of the magnet array.

7. The multi-channel flow cell device of claim 5, wherein the imager comprises an optical periscope, the system configured to move the periscope to a position adjacent and scan along one magnetic processing channel while the flow cell cartridge is received and held by the holder and while the array of magnets is positioned above and below each magnetic processing channel of the flow cell cartridge.

8. The multi-channel flow cell device of claim 5, wherein the holder comprises a core unit that is configured to regulate a temperature of the magnetic processing channels of the flow cell cartridge, wherein the core unit comprises a plurality of temperature conductive surfaces that are located such that, when the flow cell cartridge is received and held by the core unit, the temperature conductive surfaces contact the magnetic processing channels.

9. The multi-channel flow cell device of claim 5, wherein the temperature conductive surfaces comprise end surfaces of pillars formed of a temperature conductive material, each pillar holding a magnet of the magnet array.

10. The multi-channel flow cell device of claim 9, wherein the core unit further comprises air channels extending along the pillars from the cooling assembly towards the pillar end surfaces, the air channels configured to cool the pillars and the flow cell cartridge via convective air flow.

11. The multi-channel flow cell device of claim 8, wherein the core unit comprises a flow cell cartridge holder, a fluidic connector assembly configured to fluidically connect the flow cell cartridge to a pump sub-system, the magnet array, and a cooling assembly.

12. The multi-channel flow cell device of claim 11, further comprising a second core unit having a second flow cell cartridge holder, a second fluidic connector assembly, a second magnet array, and a second cooling assembly, in which the second magnet array has a configuration that is different from the magnet array of the other core unit; and in which the magnetic apparatus for processing particles is configured to alternatively receive and operate both core units.

13. The multi-channel flow cell device of claim 5, wherein the magnetic apparatus for processing particles comprises a magnetic levitation particle separation system.

14. The multi-channel flow cell device of claim 13, wherein the magnetic apparatus for processing particles comprises a minimum particle separation capacity in a single separation run of at least about 1 million particles per magnetic processing channel.

15. The multi-channel flow cell device of claim 13, wherein the magnetic apparatus for processing particles comprises a minimum particle separation capacity in a single separation run of at least about 5 million particles.

16. A multi-channel flow cell device, comprising:

(a) a substrate;

(b) a plurality of co-planar fluidic separation channels formed in the substrate, in which:

(i) each fluidic channel comprises a magnetic levitation processing channel in fluidic communication with an inlet and at least two outputs, (ii) each processing channel comprises at least one divider vertically separating a portion of the processing channel into at least an upper part and a lower part, the upper part in fluidic communication with one of the outputs and the lower part in fluidic communication with the other of the outputs, (iii) each processing channel further comprises opposing side imaging surfaces extending along a length of the processing channel, the imaging surfaces configured to allow imaging of magnetic levitation of particles in the processing channel;

the multi-channel flow cell device further comprising a plurality of openings extending through the substrate, wherein each opening extends between two adjacent processing channels, the openings configured for optical access to the imaging surfaces;

wherein the substrate and the plurality of fluidic separation channels formed in the substrate are configured as a multi-channel flow cell cartridge.

17. The multi-channel flow cell device of claim 16, wherein each processing channel extends through a spaced-apart channel beam, each channel beam comprising at least one alignment tab.

18. The multi-channel flow cell device of claim 16, further comprising:

a magnetic apparatus for processing particles comprising:

(i) a holder configured to receive and hold the flow cell cartridge; (ii) an array of magnets, the array of magnets configured to apply magnetic field gradients to the processing channels when the flow cell cartridge is received and held by the holder, the array of magnets positioned at least one of above and below the processing channels when the flow cell cartridge is received and held by the holder; and (iii) an imager configured to image vertical separation of particles in the processing channels while the flow cell cartridge is received and held by the holder and while the array of magnets is positioned at least one of above and below the processing channels.

19. The multi-channel flow cell device of claim 18, wherein the device comprises a minimum particle separation capacity in a single separation run of at least about 5 million particles.

20. The multi-channel flow cell device of claim 18, wherein the device comprises a minimum particle separation capacity in a single separation run of at least about 5 million particles, the particles having a characteristic dimension between 1 and 5 microns.

21. The multi-channel flow cell device of claim 18, wherein the device comprises a minimum particle separation capacity in a single separation run of at least about 5 million spherical particles, the particles having an average diameter of at least about 3 microns.

22. The multi-channel flow cell device of claim 18, wherein the device comprises a minimum comprises a minimum particle separation capacity in a single separation run of at least about 20 million particles per processing channel.

23. The multi-channel flow cell device of claim 18, wherein the device comprises a minimum particle separation capacity in a single separation run of at least about 20 million particles per processing channel, the particles having a characteristic dimension between 1 and 5 microns.

24. The multi-channel flow cell device of claim 18, wherein the device comprises a minimum particle separation capacity in a single separation run of at least about 20 million spherical particles per processing channel, the particles having an average size of at least about 5 microns.

* * * * *